United States Patent
Liu et al.

(10) Patent No.: US 10,762,260 B1
(45) Date of Patent: Sep. 1, 2020

(54) METHODS, SYSTEMS, AND COMPUTER PROGRAM PRODUCT FOR IMPLEMENTING AN ELECTRONIC DESIGN WITH OPTIMIZATION MAPS

(71) Applicant: Cadence Design Systems, Inc., San Jose, CA (US)

(72) Inventors: Jian Liu, Dublin, CA (US); Jing Wang, Santa Clara, CA (US); Chun-Teh Kao, Cupertino, CA (US); An-Yu Kuo, San Jose, CA (US)

(73) Assignee: Cadence Design Systems, Inc., San Jose, CA (US)

( * ) Notice: Subject to any disclaimer, the term of this patent is extended or adjusted under 35 U.S.C. 154(b) by 0 days.

(21) Appl. No.: 16/147,764

(22) Filed: Sep. 30, 2018

(51) Int. Cl.
*G06F 30/327* (2020.01)
*G06F 30/3323* (2020.01)
*G06F 111/04* (2020.01)

(52) U.S. Cl.
CPC ........ *G06F 30/327* (2020.01); *G06F 30/3323* (2020.01); *G06F 2111/04* (2020.01)

(58) Field of Classification Search
CPC .. G06F 17/505; G06F 17/504; G06F 2217/06; G06F 30/327; G06F 30/3323; G06F 2111/04
See application file for complete search history.

(56) References Cited

U.S. PATENT DOCUMENTS

| | | | |
|---|---|---|---|
| 7,669,164 B1 * | 2/2010 | Ma | G06F 17/5054 716/138 |
| 2010/0324878 A1 * | 12/2010 | Lee | G06F 17/5068 703/14 |
| 2015/0058816 A1 * | 2/2015 | Sakanushi | G06F 17/5072 716/54 |

* cited by examiner

*Primary Examiner* — Vuthe Siek
(74) *Attorney, Agent, or Firm* — Vista IP Law Group, LLP

(57) ABSTRACT

Disclosed are methods, systems, and articles of manufacture for implementing an electronic design having embedded circuits. These techniques identify a specification of an electronic design, a parameter for optimization, at least one optimization target for the parameter, and initial grids for the electronic design. An optimization map may be determined, by at one or more optimization modules that are stored at least partially in memory of and function in conjunction with at least one microprocessor of a computing system, for the electronic design at least by performing one or more analyses that refine the initial grids for the optimization map with respect to the parameter and the at least one optimization target. The electronic design may be implemented based at least in part upon the optimization map.

20 Claims, 24 Drawing Sheets

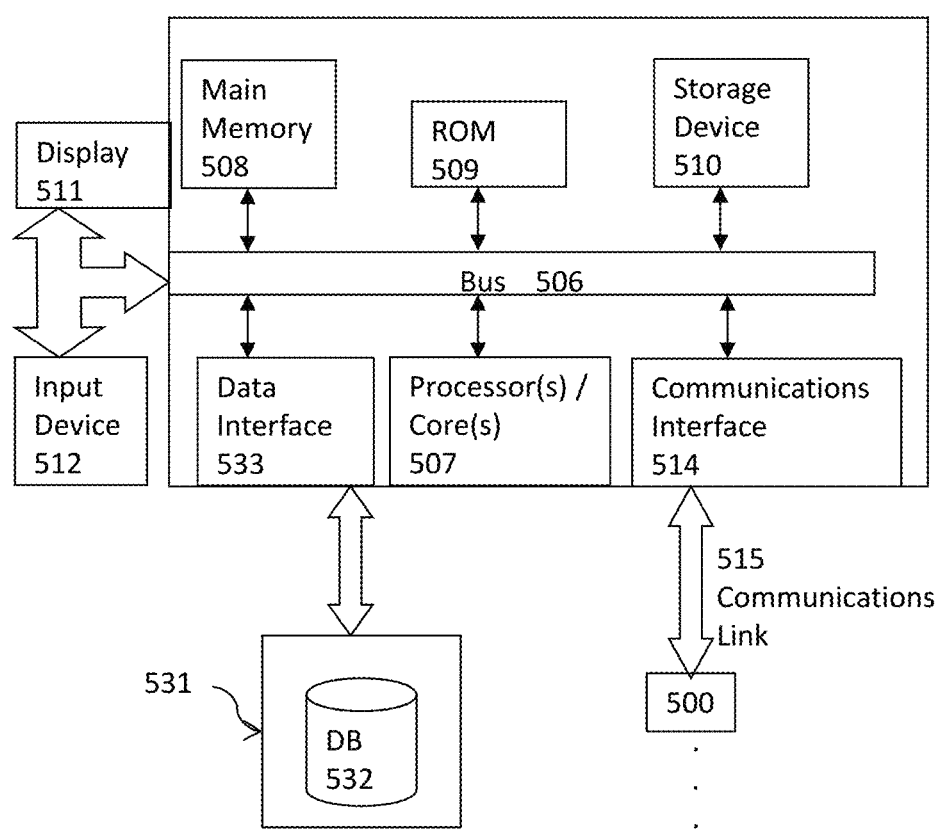

METHODS, SYSTEMS, AND COMPUTER PROGRAM PRODUCT FOR IMPLEMENTING AN ELECTRONIC DESIGN WITH OPTIMIZATION MAPS

COPYRIGHT NOTICE

A portion of the disclosure of this patent document contains material, which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND

Modern electronic designs (e.g., electronic systems, etc.) often include electronic devices or components that require a higher power due to for example, more transistors packed in a smaller die and hence generate more heat that may cause the performance of the electronics to degrade if such heat is not properly dealt with. Active or natural heat dissipation mechanisms have thus become more critical in modern electronic systems. For example, active cooling mechanisms (e.g., fans, liquid cooling mechanisms, etc.) may be installed within an enclosure to direct heat away from the electronic components through passive or natural cooling mechanisms (e.g., an arrangement of ducts to direct airflow through arrays of holes or openings along the sides of an enclosure of an electronic system).

Modern electronic designs often also include electronic devices or components that are more susceptible to interferences (e.g., electromagnetic interference or EMI) due to, for example, higher operating frequencies. The scaling of VLSI technology and the ever increasing number of transistors in an IC (integrated circuit) have further exacerbate the severity of interferences. Techniques such as electromagnetic shielding (EM shielding) have thus become an important criterion in the designs of modern electronic designs. EM shielding often involves surrounding electronics, wires, cables, etc. with conductive (or magnetic) materials to guard against incoming or outgoing electromagnetic frequencies (EMF).

Nonetheless, the requirements for managing thermal behaviors of an electronic design often conflict those for managing EMI. For example, more and/or larger openings in the enclosure of an electronic system may be preferred or even required for proper management of the thermal behaviors of the electronic system. On the other hand, more and/or larger openings in the enclosure an electronic system may cause adverse effects in properly containing EMI. To further exacerbate the challenges, two separate teams are usually allocated—one handling the EMI issues, and the other handing the thermal issues. These two separate teams often use two different sets of tools in two different physics domains (e.g., heat transfer versus electromagnetics) in accomplishing their respective tasks.

In addition, modern electronic designs are often limited to a certain footprint so that the designers cannot freely claim an unlimited space to complete the design. For example, mobile computing devices (e.g., cellular phones, laptop computers, etc.), automobile electronic control units (ECUs) have relatively fixed form factors required or driven either by market requirements or by the requirements of customers (e.g., automobile manufacturers limiting the space of an ECU). As the technology advances, these requirements may nevertheless remain. As a result, designers are often required to produce multiple generations of products, each more advanced than its predecessor, within such limited spaces.

Conventional approaches tackle these challenges either by trial-and-error or by having two separate teams that separately work on the thermal problems and the EMI problems with their respective, different sets of tools. For example, a thermal team may use various tools concerning heat transfer mechanisms to resolve problems in the thermal behaviors of an electronic design, while an EMI term may use tools concerning electromagnetic simulations to tackle the problems resulting from EMI. These two separate sets of tools often do not communicate or interact with each other. For example, a thermal team may generate some predicted thermal behavior of an electronic system by performing thermal analyses. Similarly, an EMI team may generate some predicted electromagnetic behavior of or even prediction of EMI for the same electronic system by performing EMI analyses. These analysis results at best inform the other team how the analyzed electronic design performs, yet these results provide no other useful information for the other team to complete its design tasks. As a result, the design process thus involves estimates, guesstimates, or even guesses and therefore requires many unnecessary rounds of iterations that waste a huge amount of computational resources, not to mention causing significant delays in completing the electronic design with sufficient viability, reliability, and performance.

Therefore, there exists a need for a method, system, and computer program product for implementing an electronic design with optimization maps to address at least the aforementioned problems, shortcomings, and challenges. It shall be noted that some of the approaches described in this Background section constitute approaches that may be pursued, but not necessarily approaches that have been previously conceived or pursued. Therefore, unless otherwise explicitly stated, it shall not be assumed that any of such approaches described in this section quality as prior art merely by virtue of their inclusion in this section.

SUMMARY

Disclosed are method(s), system(s), and article(s) of manufacture for implementing an electronic design with optimization maps in one or more embodiments. Some embodiments are directed at a method for implementing an electronic design having embedded circuits.

Some embodiments of the present invention identify a specification of an electronic design, a parameter for optimization, at least one optimization target for the parameter, and initial grids for the electronic design. An optimization map may be determined, by at one or more optimization modules that are stored at least partially in memory of and function in conjunction with at least one microprocessor of a computing system, for the electronic design at least by performing one or more analyses that refine the initial grids for the optimization map with respect to the parameter and the at least one optimization target. The electronic design may be implemented based at least in part upon the optimization map.

In some of these embodiments, a plurality of optimization modes may be identified for the electronic design; and a plurality of optimization targets including the at least one optimization target may also be identified for the plurality of optimization modes. Moreover, a set of parameters may be identified for each optimization mode of the plurality of optimization modes; and a set of thresholds may further be identified for the set of parameters. Optionally, a set of constraints may be identified for the set of parameters.

In addition or in the alternative, some embodiments determine whether previous analysis results for a first optimization mode exist. One or more first parameter spaces may be constrained into one or more first constrained parameter spaces for the first optimization mode with at least the previous analysis results; and one or more second parameter spaces may also be constrained into one or more second constrained parameter spaces for a second optimization mode with at least the previous analysis results. In some of these embodiments, an optimization mode and the at least one parameter for optimization may be identified for the optimization map; and the optimization map may be generated or updated for the at least one parameter for optimization at least by performing one or more first analyses that correspond to an optimization mode with the initial grids.

Some embodiments further determine whether the one or more first analyses satisfy a termination criterion. When it is determined that the one or more first analyses do not satisfy the termination criterion, these embodiments identify first grids from the initial grids for further analyses of predicted behaviors generated by the one or more first analyses for the electronic design; these embodiments further transform the initial grids into first adaptive grids by adding one or more additional grids to the initial grids based in part or in whole upon the predicted behaviors of the electronic design; and these embodiments perform at least one first analysis of the one or more first analyses on the electronic design with the first adaptive grids.

Some of the immediately preceding embodiments determine whether analysis results of the at least one first analysis satisfy the termination criterion with the first adaptive grids. When it is determined that the at least one first analysis satisfies the termination criterion, these embodiments determine whether another parameter for optimization exists but has not been processed. These embodiments further identify one or more safe regions in the optimization map and one or more global safe region from the one or more safe regions in the optimization map.

With the optimization map, some embodiments identify a global safe region from the one or more global safe regions and a plurality of sub-regions in the global safe region based at least in part upon the at least one optimization target for the optimization mode. These embodiments further determine one or more index values for one or more indices for the plurality of sub-regions or for the global safe region. In some of these embodiments, the optimization map may be updated with at least the one or more index values for the one or more indices; and a decision may be made to decide whether one or more other global safe regions exist but have not been processed.

Some embodiments are directed at a hardware system that may be invoked to perform any of the methods, processes, or sub-processes disclosed herein. The hardware system may include at least one processor or at least one processor core, which executes one or more threads of execution to perform any of the methods, processes, or sub-processes disclosed herein in some embodiments. The hardware system may further include one or more forms of non-transitory machine-readable storage media or devices to temporarily or persistently store various types of data or information. Some exemplary modules or components of the hardware system may be found in the System Architecture Overview section below.

Some embodiments are directed at an article of manufacture that includes a non-transitory machine-accessible storage medium having stored thereupon a sequence of instructions which, when executed by at least one processor or at least one processor core, causes the at least one processor or the at least one processor core to perform any of the methods, processes, or sub-processes disclosed herein. Some exemplary forms of the non-transitory machine-readable storage media may also be found in the System Architecture Overview section below.

BRIEF DESCRIPTION OF THE DRAWINGS

The drawings illustrate the design and utility of various embodiments of the invention. It should be noted that the figures are not drawn to scale and that elements of similar structures or functions are represented by like reference numerals throughout the figures. In order to better appreciate how to obtain the above-recited and other advantages and objects of various embodiments of the invention, a more detailed description of the present inventions briefly described above will be rendered by reference to specific embodiments thereof, which are illustrated in the accompanying drawings. Understanding that these drawings depict only typical embodiments of the invention and are not therefore to be considered limiting of its scope, the invention will be described and explained with additional specificity and detail through the use of the accompanying drawings in which:

FIG. 5 illustrates a computerized system on which a method for implementing an electronic design with optimization maps may be implemented.

DETAILED DESCRIPTION

Figure 1A:
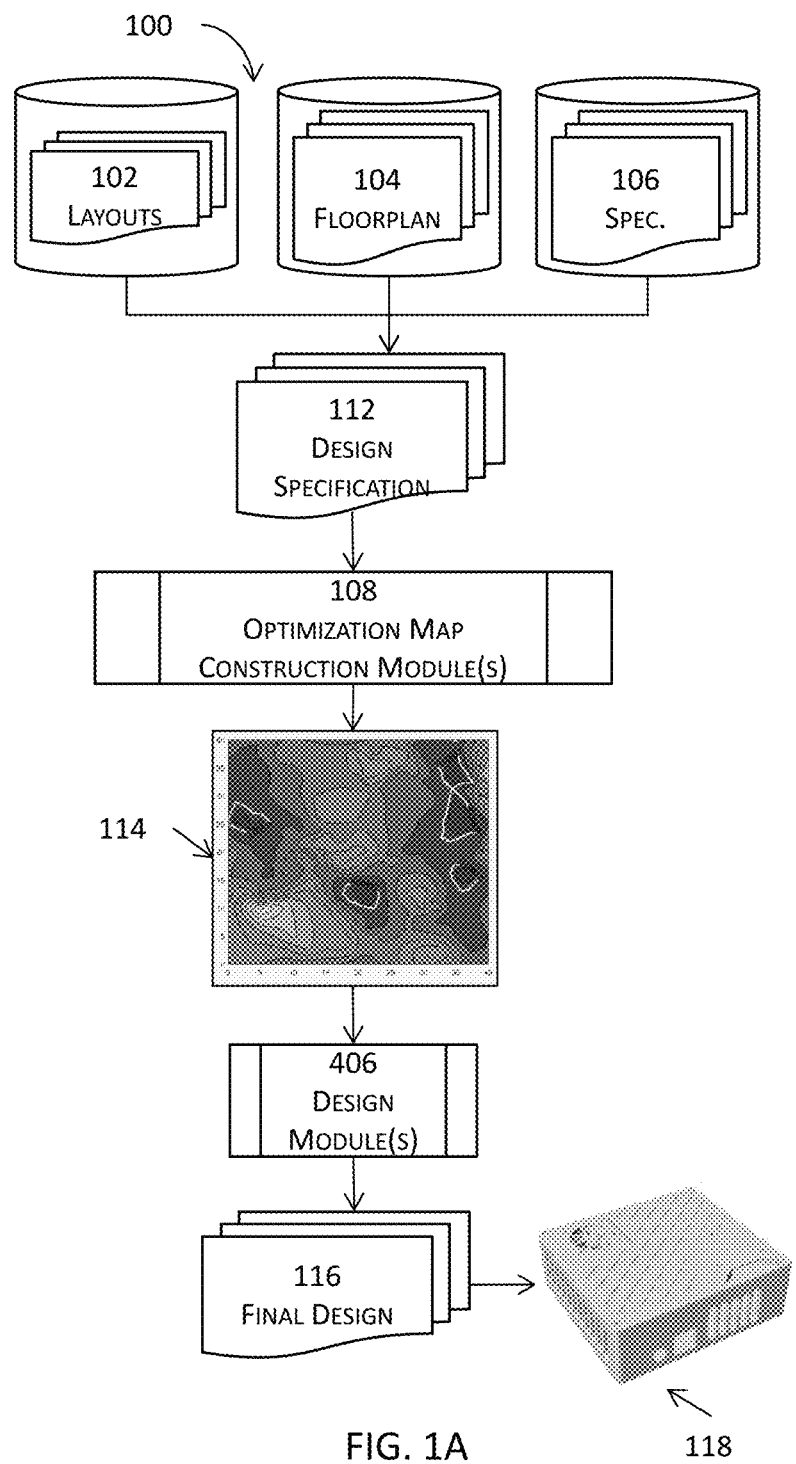
FIG. 1A illustrates a high level block diagram of a simplified system for implementing an electronic design with optimization maps in one or more embodiments.

Various techniques are directed to implementing an electronic design having embedded circuits in various embodiments. In these embodiments, the present invention performs co-simulations or co-analyses using electronic design tools in multiple physics domains on an electronic design with initial grids overlaid in the electronic design. For example, in designing an automobile electronic control unit (ECU) having a power supply that is considered as a heat source in the ECU, the present invention may first perform a thermal analysis on the ECU with the power supply placed at each grid of a set of initial grids with respect to a parameter for optimization (e.g., the location of a power supply). The analysis results at these grids are then examined to determine whether the analysis results are well-behaved. One of the purposes of the set of initial grids is to set forth the baseline for subsequent refinement and optimization. Therefore, the set of initial grids often contains a coarse set of grids. As a result, the analysis results of two immediately neighboring grids may exhibit a larger than desired variation or less then desired resolution.

The present invention then intelligently determine one or more adaptive grids based on the analysis results for the set of initial grids. In an example where the analysis results (e.g., temperature values) for two immediately neighboring grids exhibit a different greater than a threshold (e.g., two degrees Fahrenheit), the present invention may add one adaptive node along the direction of the detected difference (or in the opposite direction). With the adaptive grids determined, the present invention may further perform the same analysis with this updated set of grids until the analysis results provide sufficient resolution and become better-behaved. At this stage, the analysis is deemed "converged".

The present invention then identifies one or more regions in the electronic design exhibiting behaviors that satisfy an optimization target (e.g., temperature lower than 75 degrees Celsius) from the converged analysis results. These one or more regions are considered as "safe regions" and may be so identified with graphical and/or textual emphasis in an optimization map. The present invention may then determine one or more index values for a plurality of sub-regions in a safe region. These one or more safe regions will be used in guiding the implementation of the electronic design.

The grids are determined by sampling or sweeping the space of the parameter of interest for optimization. In the aforementioned example where the location of the power supply is the parameter for optimization, the present invention sample the design space to determine various points in the design space for the set of initial grids as well as for adaptive grids. In some embodiments where there are more than one parameter for optimization in a physics domain, the present invention may perform the corresponding analyses to generate one optimization map for each parameter for optimization or to generate one optimization map for a plurality of parameters by sampling or sweeping the combinatorial space of the plurality of parameters to determine the grids.

Similarly, the present invention may perform, either sequentially or in parallel, other analyses in one or more other physics domains and construct one or more corresponding optimization maps in a similar manner, although using different analysis engines for these one or more other physics domains. Any analysis results of an earlier analysis that has already been performed at the time of performance of a latter analysis may be referenced to determine one or more dynamic filters to filter the parameter space in a subsequent analysis that constructs or updates an optimization, regardless of whether the earlier analysis is in the same physics domain as the latter analysis so long as these two analyses have a parameter in common. For example, an existing analysis result of a thermal analysis with respect to the locations of a power supply in an ECU may be referenced in constructing one or more filters to constrain the space for a latter EMI analysis, and vice versa.

The present invention may then leverage these optimization maps in the implementation of the electronic design ranging from, for example, concept-and-feasibility studies, floorplanning, virtual prototyping, etc. to final verification of the electronic design before design closure or signoff to facilitate the manufacturing of the electronic design.

Various embodiments will now be described in detail with reference to the drawings, which are provided as illustrative examples of the invention so as to enable those skilled in the art to practice the invention. Notably, the figures and the examples below are not meant to limit the scope of the present invention. Where certain elements of the present invention may be partially or fully implemented using known components (or methods or processes), only those portions of such known components (or methods or processes) that are necessary for an understanding of the present invention will be described, and the detailed descriptions of other portions of such known components (or methods or processes) will be omitted so as not to obscure the invention.

Further, various embodiments encompass present and future known equivalents to the components referred to herein by way of illustration. Moreover, it shall also be noted that the figures are intended only to facilitate the description of the disclosed embodiments and/or examples but are not representative of an exhaustive treatment of all possible embodiments and/or examples and are not intended to impute any limitations as to the scope of the claims, embodiments, and/or examples. In addition, any figures or their corresponding description need not necessarily portray all aspects or advantages in any particular environment. Any aspect or advantage described in conjunction with a particular embodiment and/or example is not necessarily limited to that embodiment and/or example and can be practiced in any other embodiments and/or examples even if not so illustrated. References throughout this specification to "some embodiments" or "other embodiments" refer to a particular feature, structure, material or characteristic described in connection with the embodiments as being included in at least one embodiment. Thus, the recitation of the phrases "in some embodiments" or "in other embodiments" in various places throughout this specification is not necessarily referring to the same embodiment or embodiments. The disclosed embodiments are not intended to be limiting of the claims.

In addition, unless otherwise explicitly stated, the recitation of the phrases "in some embodiments" or "in other embodiments" in this specification does not necessarily mean any of the features, advantages, aspects, etc. described "in some embodiments" do not or cannot be combined with any of the other features, advantages, aspects, etc. described "in other embodiments". Thus, any features, advantages, aspects, etc. described in this specification can be combined and can function in conjunction with each other, unless otherwise explicitly stated or recited.

FIG. 1A illustrates a high level block diagram of a simplified system for implementing an electronic design with optimization maps in one or more embodiments. More specifically, design specification of an electronic design 112 may be identified from, for example, the memory or one or more storage devices 100. For example, a layout session of an EDA layout tool may open an IC (integrated circuits) layout 102 or a floorplan 104, or a first PCB (printed circuit board) layout (not shown), etc. as the design specification 112. A design specification 106 may or may not necessarily be a layout or schematic of the underlying electronic system. For example, a design specification may include a specification of market or design requirements delineating the requirements on the dimensions, components, performance, or any other aspects of the electronic design.

One or more computing systems (not shown) may invoke and execute a plurality of modules, which are specifically programmed and stored at least partially in memory of and functions in conjunction with at least one microprocessor or processor core of the one or more computing systems, to perform various functions to implement electronic designs with optimization maps. For example, the one or more computing systems may execute one or more optimization map construction modules (108) to perform various analyses with initial grids with respect to a parameter for optimization. The one or more optimization map construction modules (108) may further perform adaptive refinement of the initial grids with adaptive grids and perform further analyses until the analysis over a set of updated grids are deemed as converged. The one or more optimization map construction modules (108) may then generate one or more optimization maps 114 showing one or more safe regions. The present invention further guides one or more design modules 406 with the one or more optimization maps 114 to facilitate the implementation of a final version 116 of the electronic design (e.g., a signed-off version) as well as the eventual fabrication or manufacturing the underlying electronic system 118 with the electronic design.

The present invention provides a more efficient and more accurate solution to address at least the shortcomings and problems with conventional approaches. By leveraging optimization maps spanning across multiple physics domains, the present invention eliminates the iterative process and guesswork (and hence computational resource utilization) of conventional approaches by precisely guiding the electronic design implementation to select the parameter values (e.g., locations of components, choice of materials, dimensions, sizes, geometries, and/or arrangements (e.g., ventilation hole pattern) of various features or components in the electronic design. The presentation also provide a more accurate implementation flow that produces a more accurate electronic design that involve multiple physics domains.

Figure 1B:
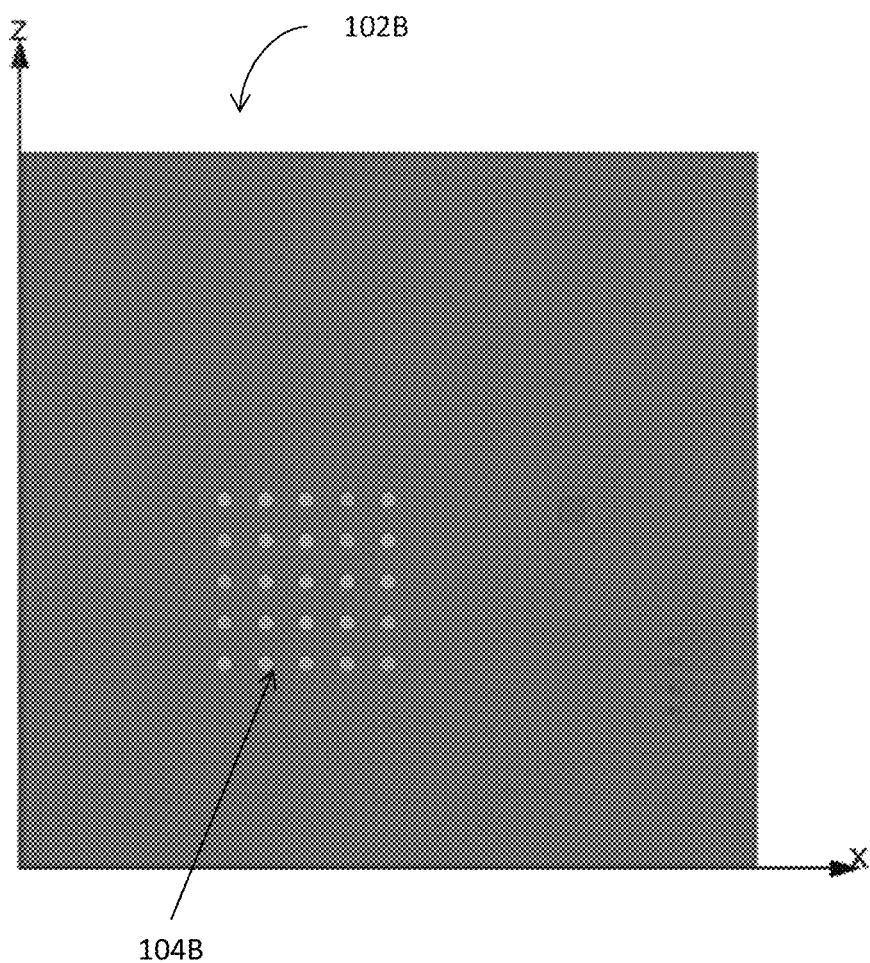
FIGS. 1B-1C illustrate a portion of a simplified electronic design to which some or all techniques described herein apply in one or more embodiments.
Figure 1C:
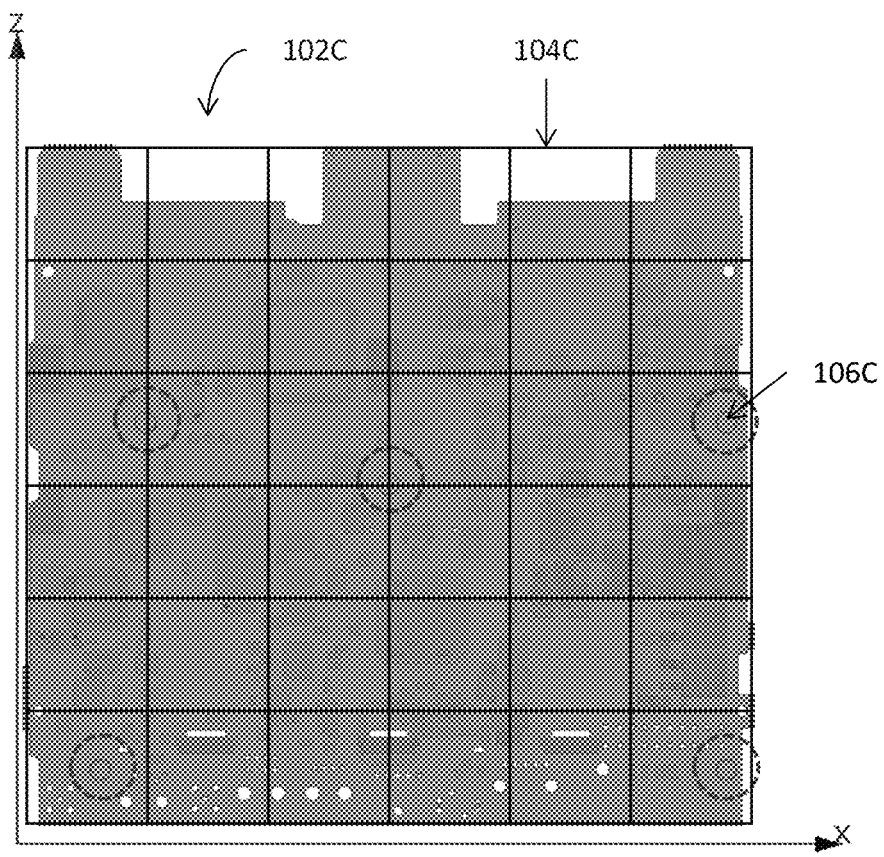

FIGS. 1B-1C illustrate a portion of a simplified electronic design to which some or all techniques described herein apply in one or more embodiments. More specifically, FIG. 1B illustrates a planar view of an external enclosure 102B of an electronic design. This external enclosure 102B includes an array of openings 104B for purposes such as ventilation (e.g., natural or forced convection for heat dissipation). FIG. 1C illustrates a simplified example of a PCB (printed circuit board) design 102C for the electronic design.

The PCB design includes multiple openings 106C that, if improperly implemented, may cause electrical issues and/or even thermal issues. For the ease of illustration and explanation, a parameter for optimization is the location of an electronic component that acts as both a heat source and an electromagnetic interference source. That is, one of the design objectives is to optimize the placement of the electronic component on this PCB 102C. FIG. 1C also shows a set of initial grids 104C where an intersection of two line segments represents a grid. The present invention first performs various analyses in multiple physics domains at these initial grids 104C and further use the analysis results at these initial grids to intelligently add one or more adaptive grids in constructing an optimization map for the parameter (e.g., the placement location of the electronic device).

Figure 1D:
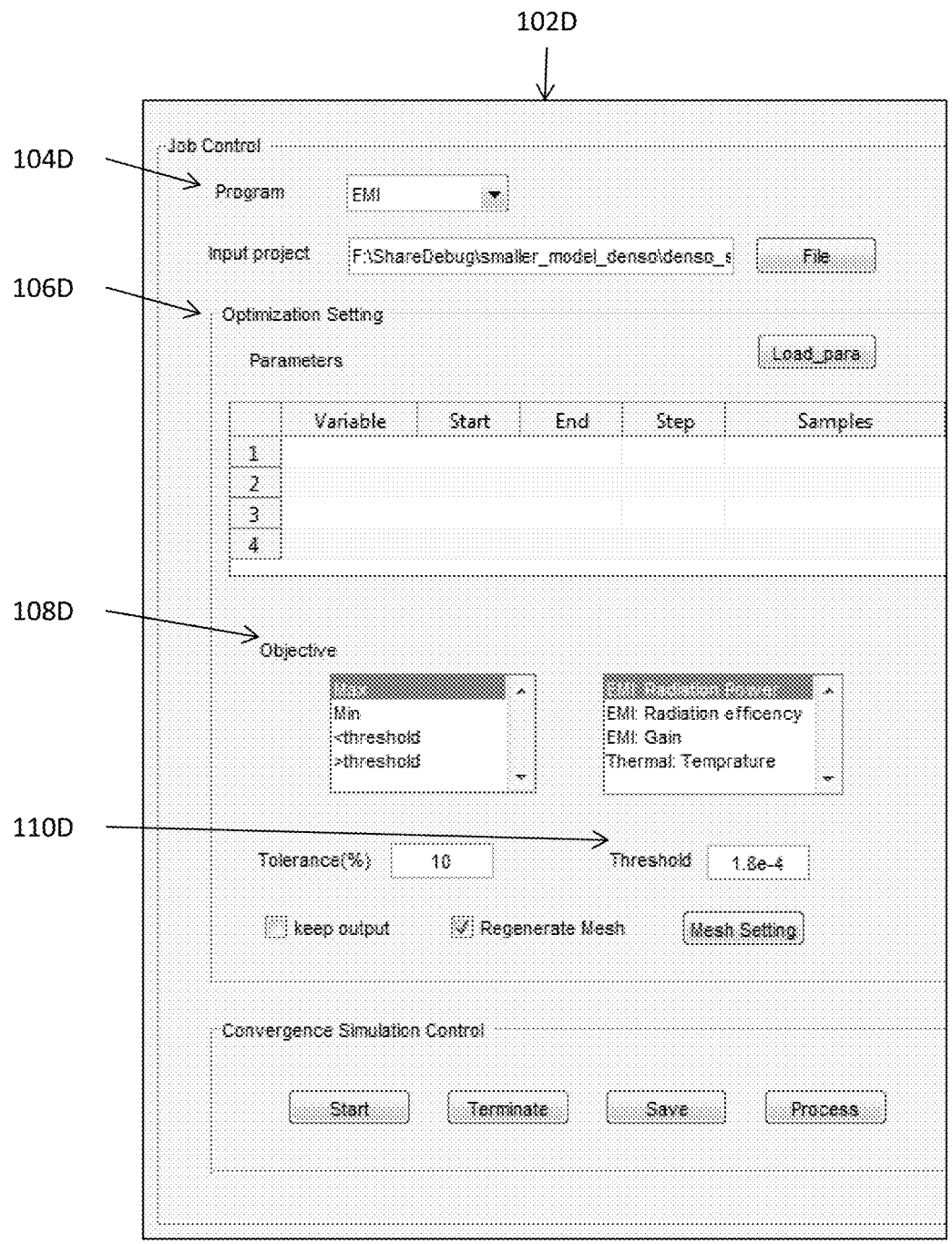
FIGS. 1D-1R illustrate some examples of the application of various techniques described herein to the simplified electronic design in one or more embodiments.
Figure 1E:
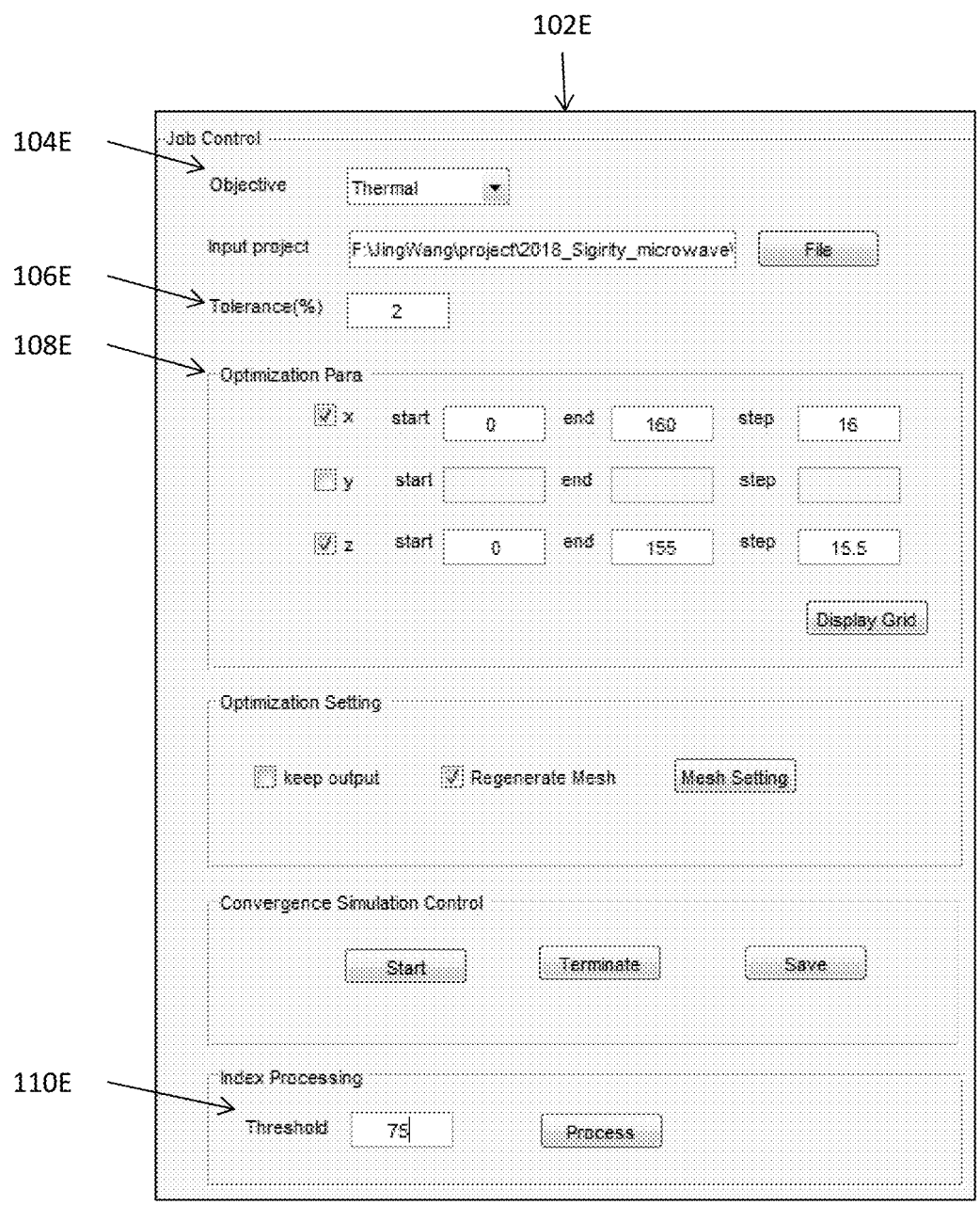
Figure 1F:
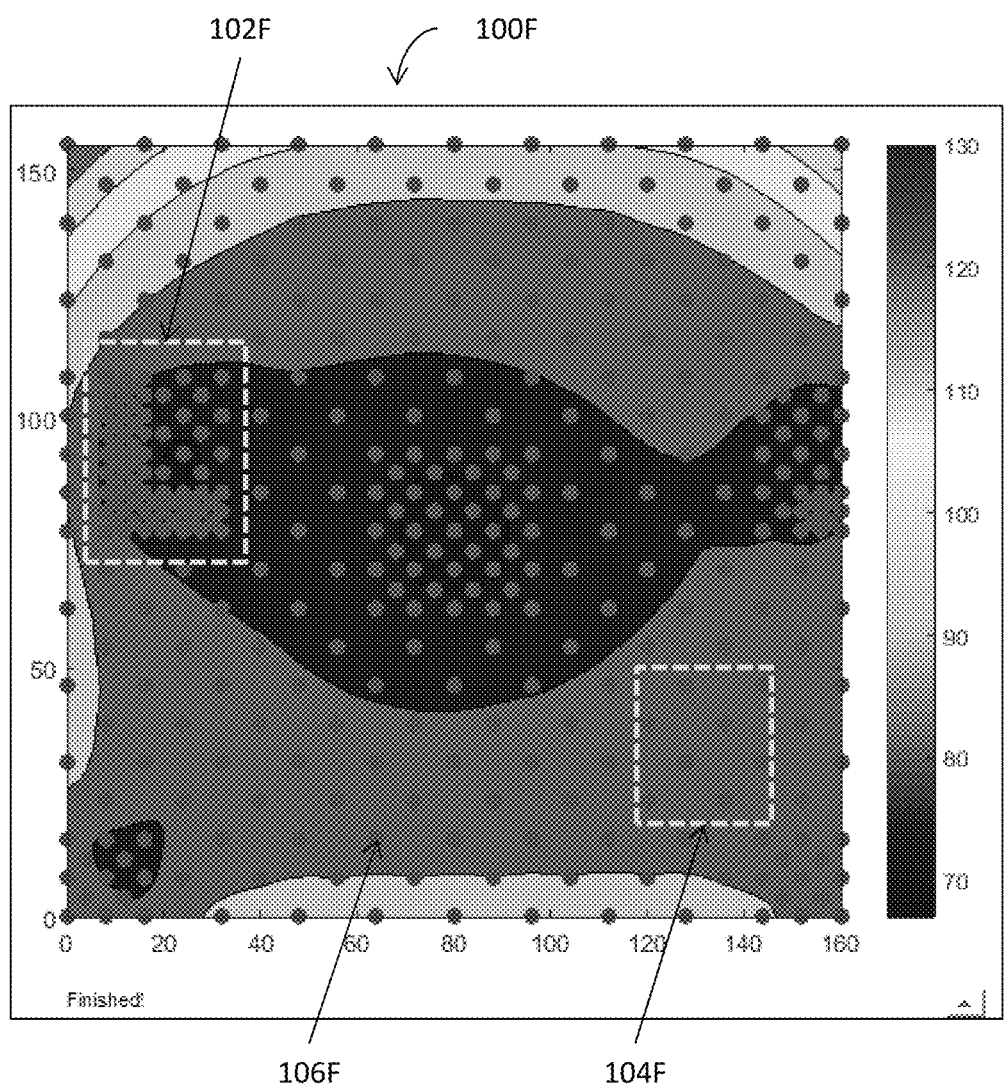
Figure 1G:
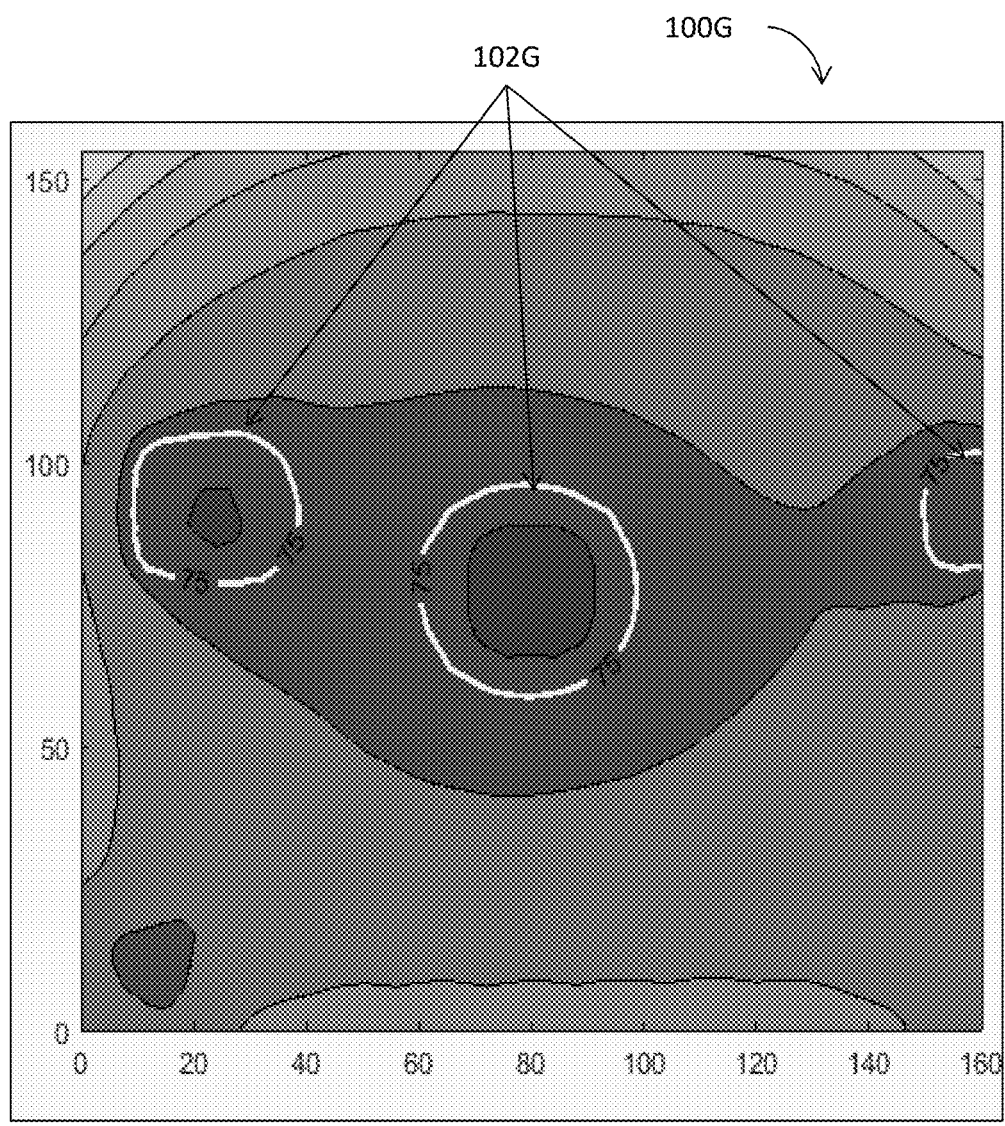
Figure 1H:
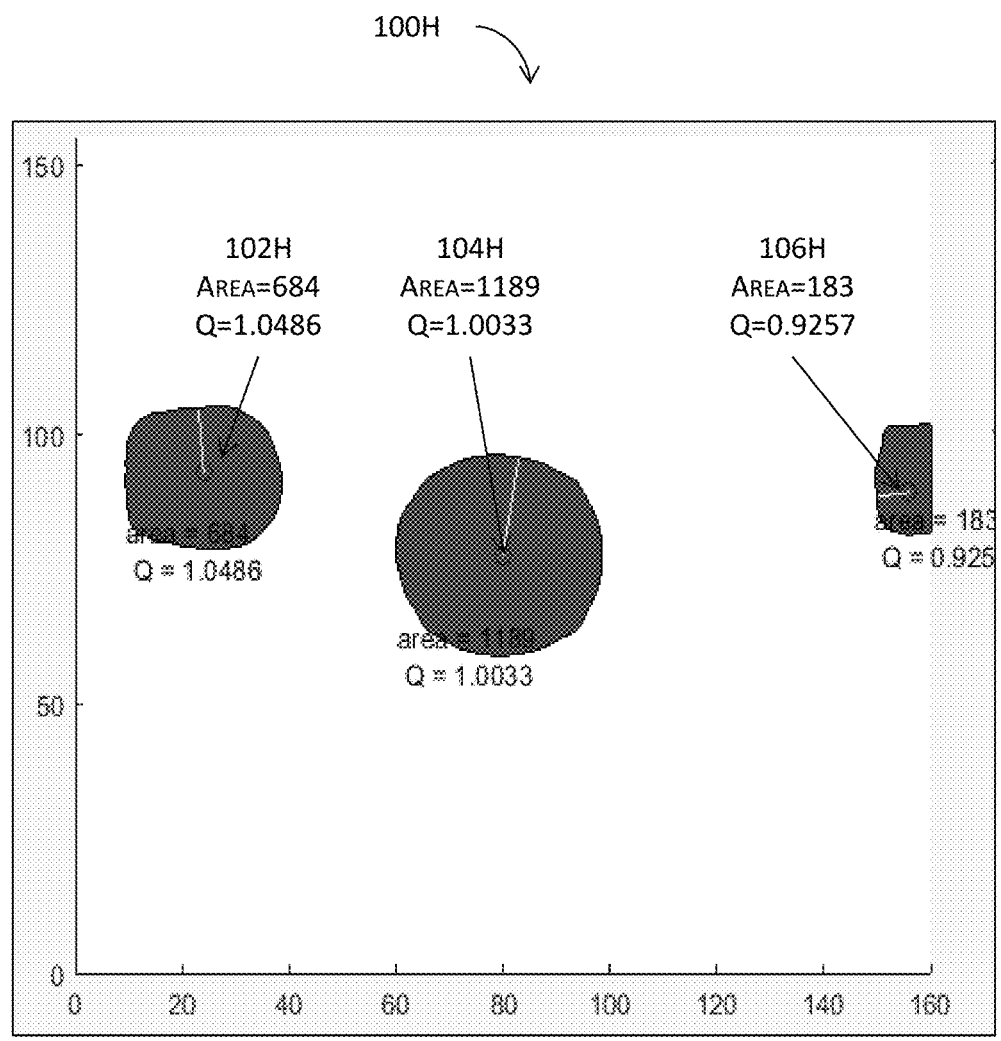
Figure 1I:
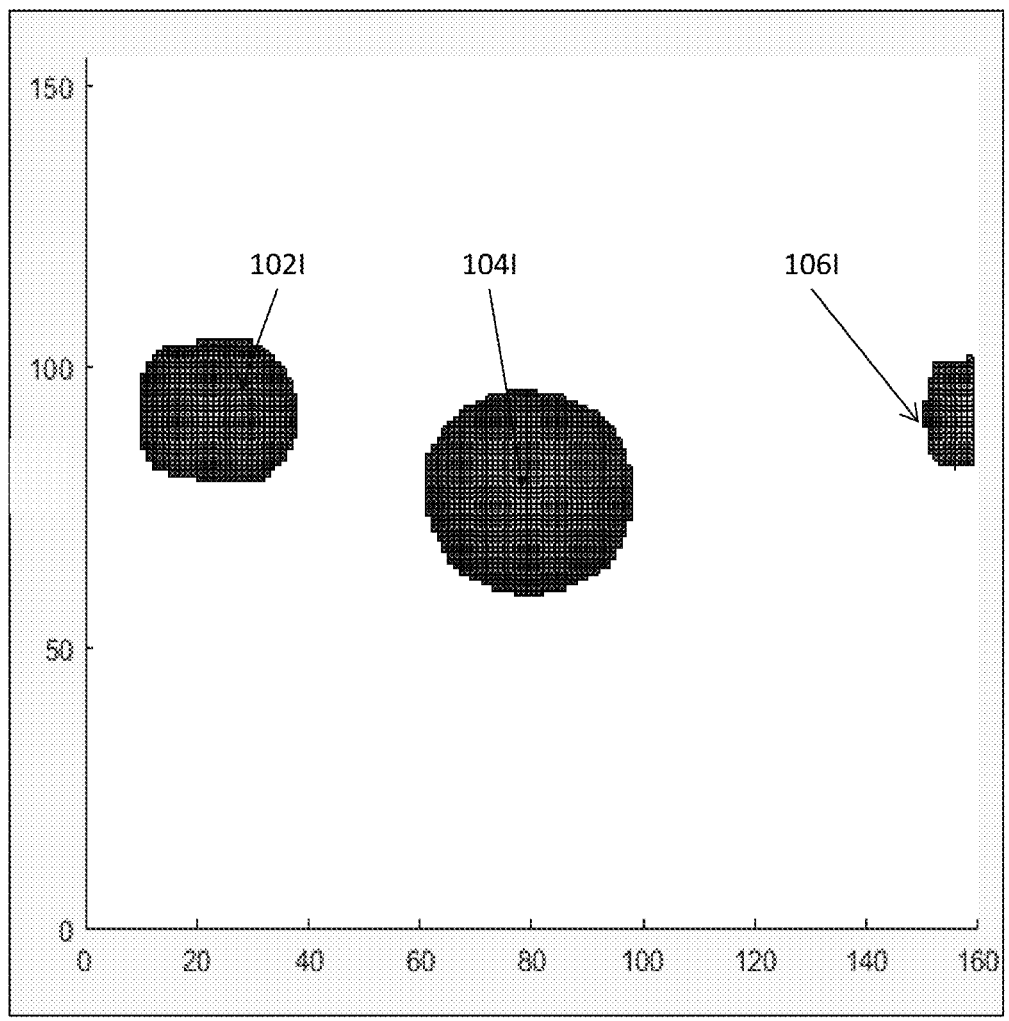
Figure 1J:
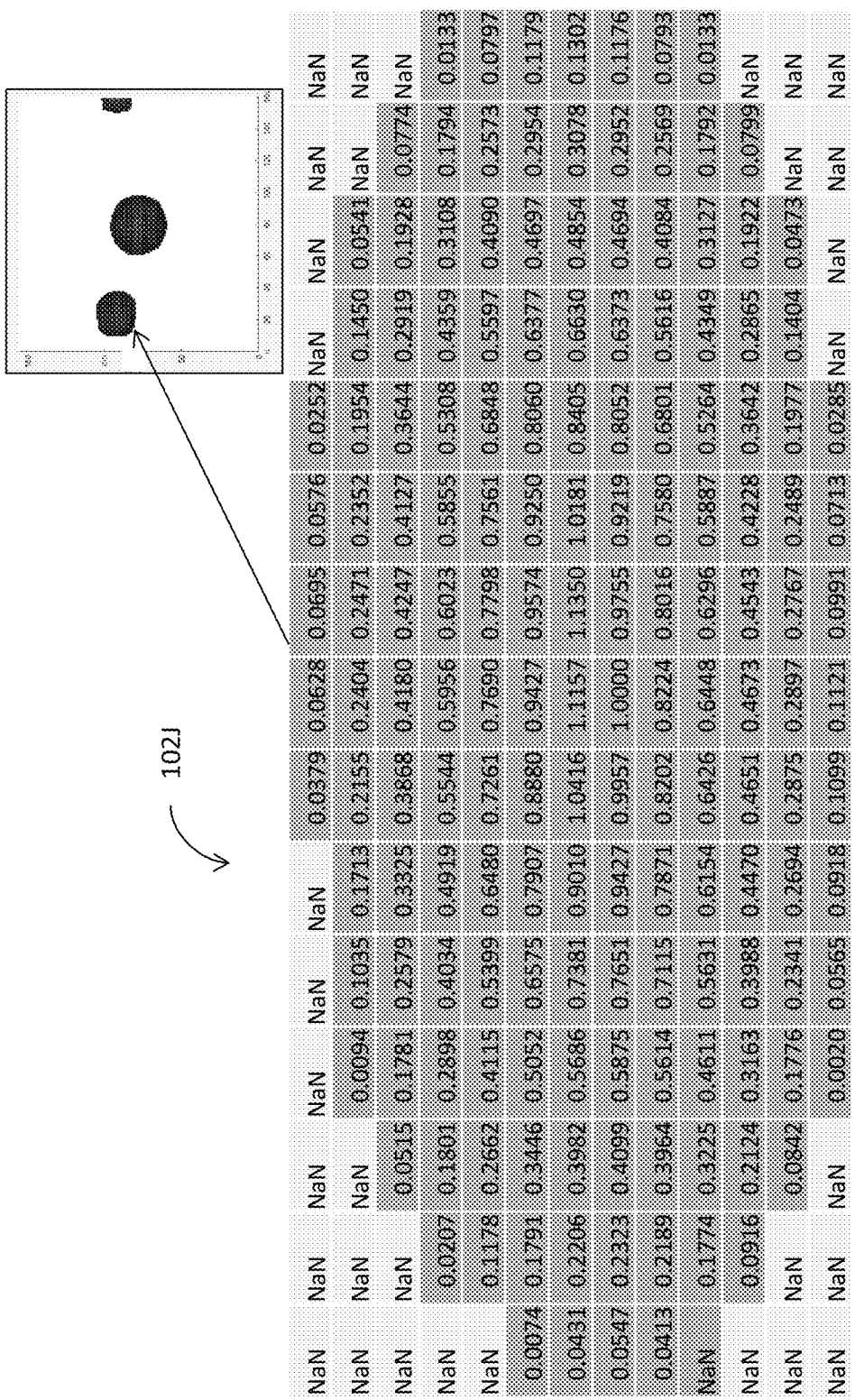
Figure 1K:
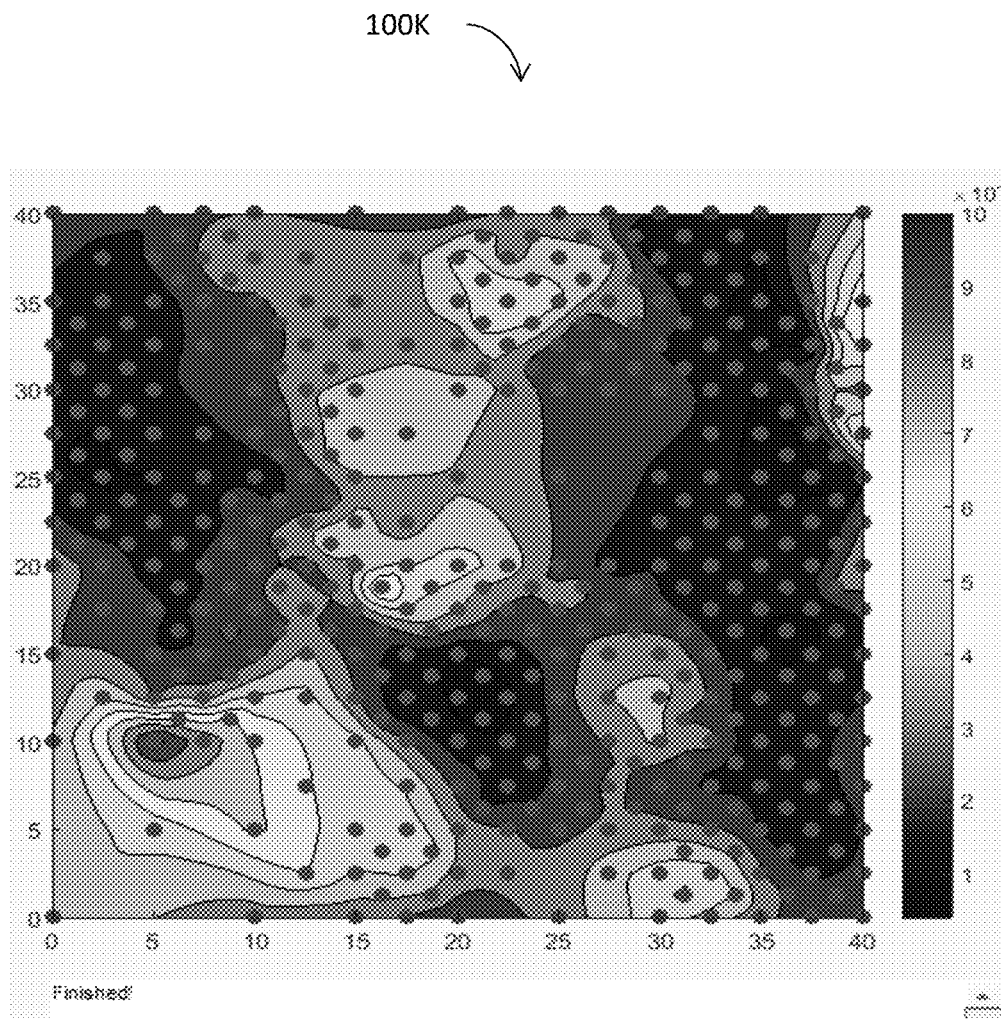
Figure 1L:
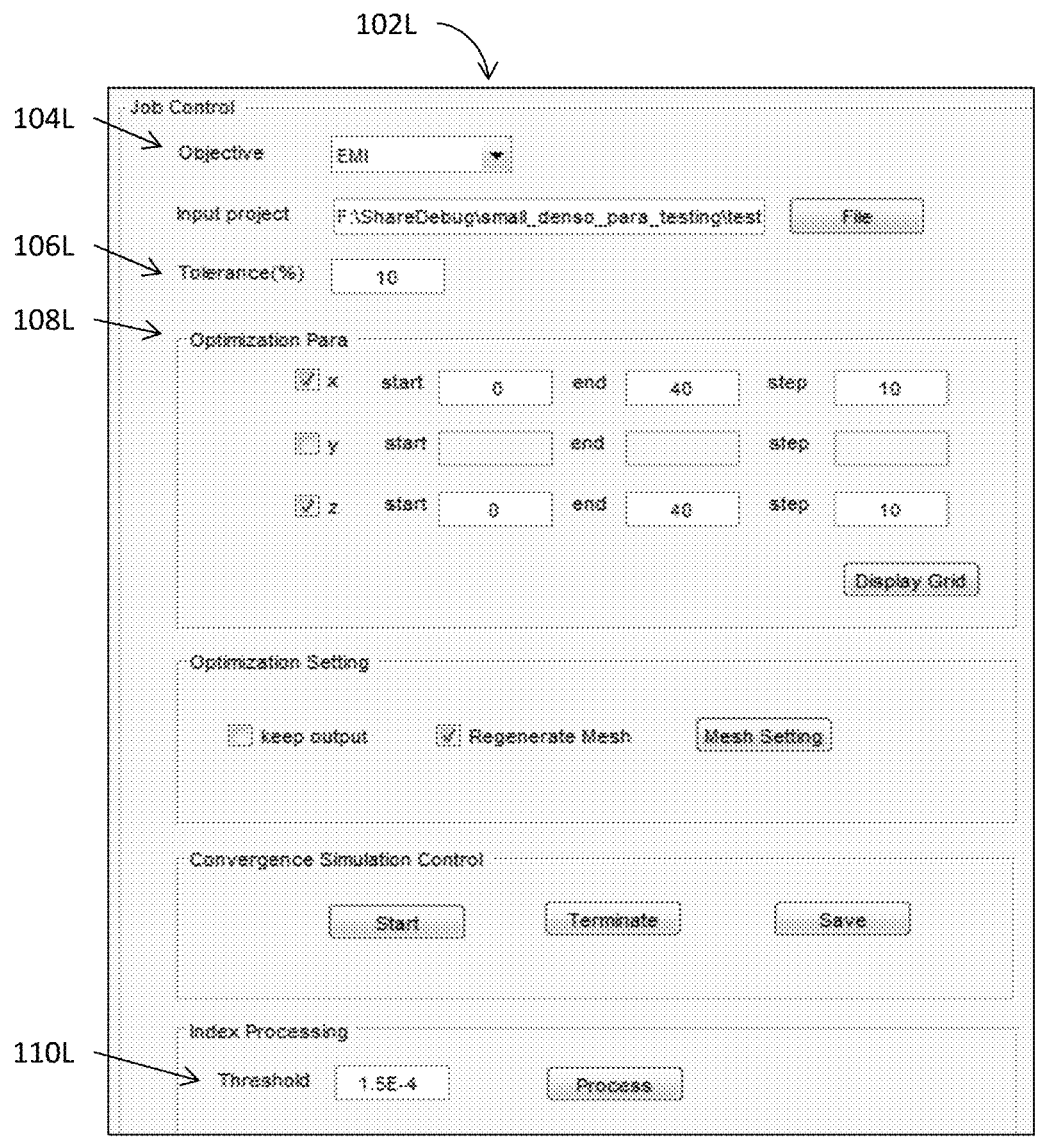
Figure 1M:
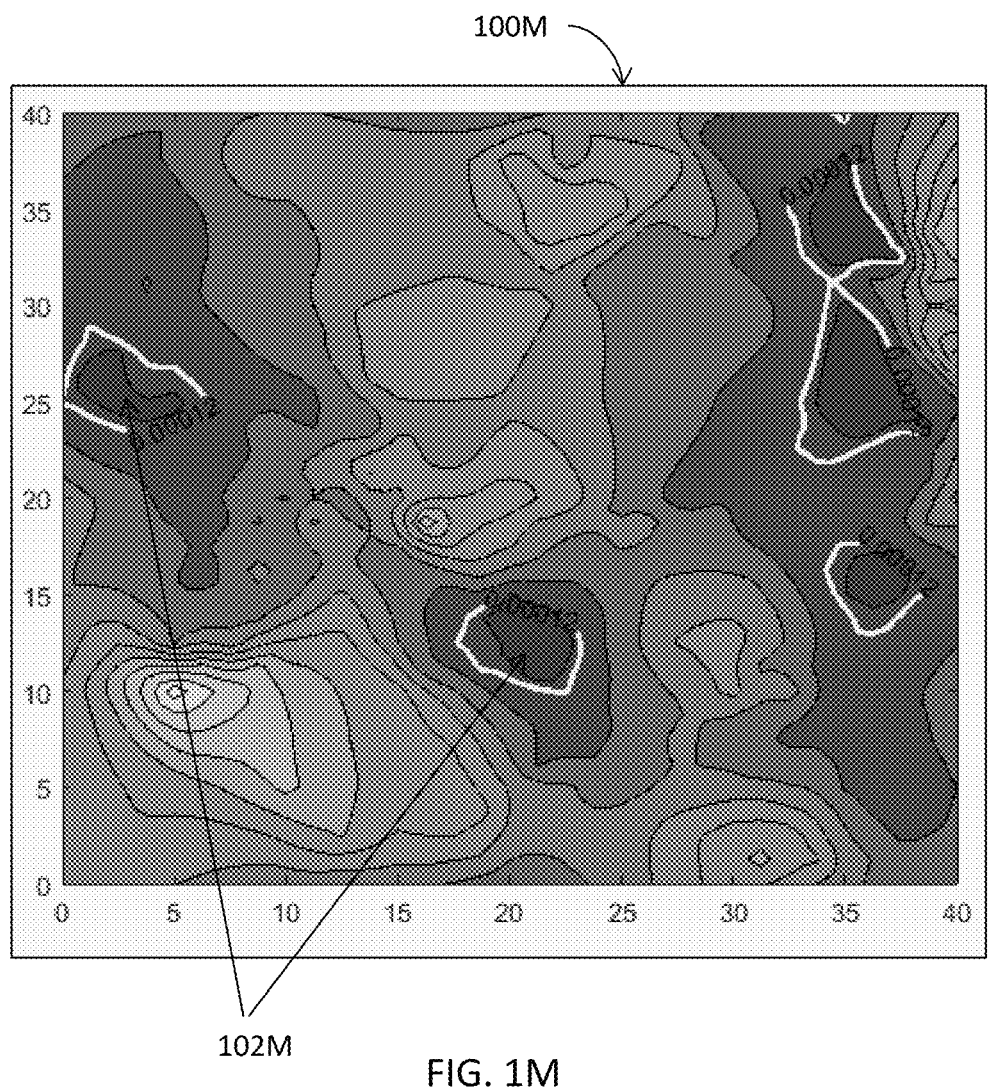
Figure 1N:
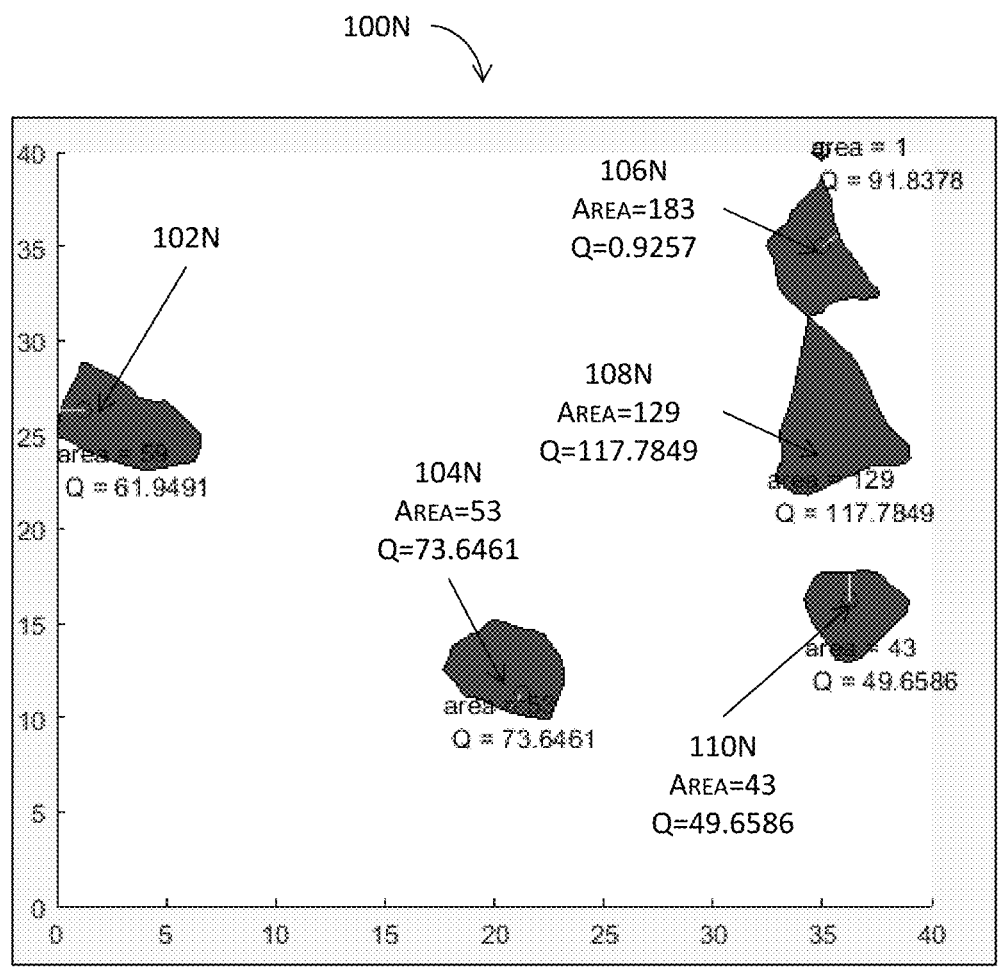
Figure 10:
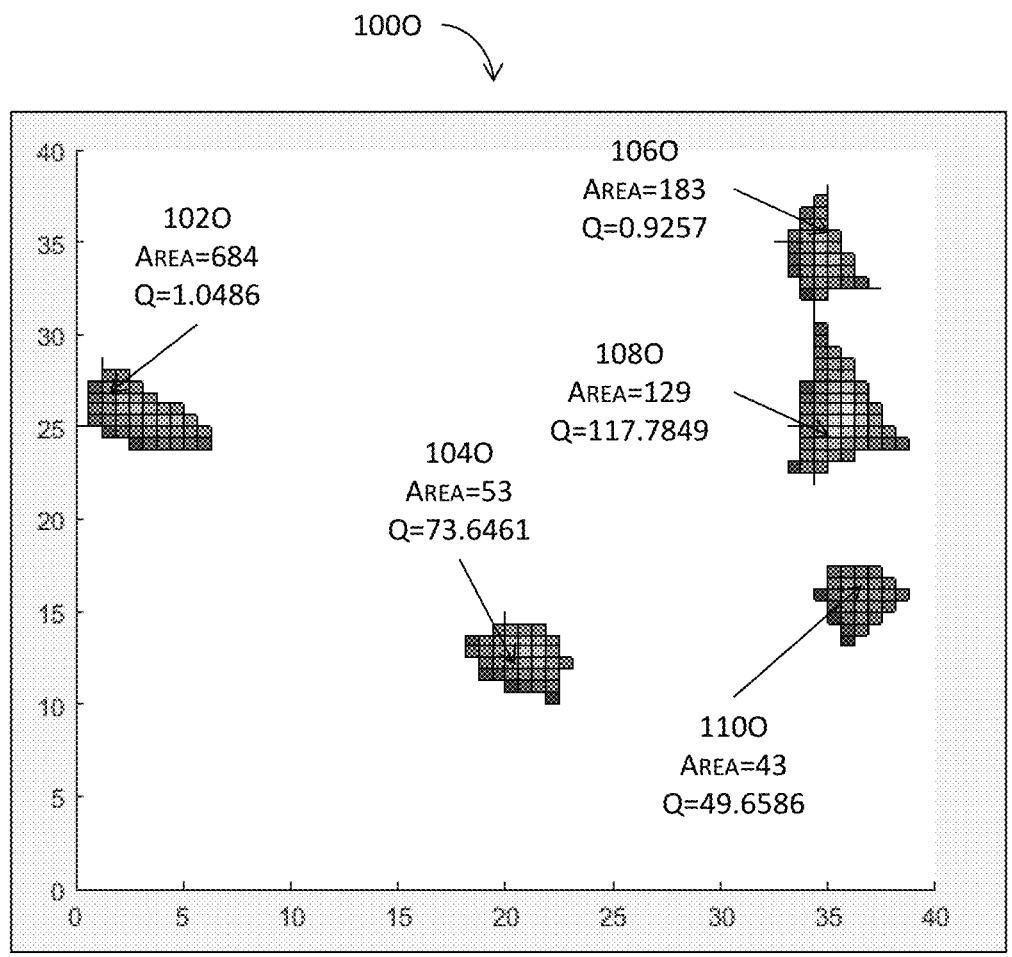
Figure 1P:
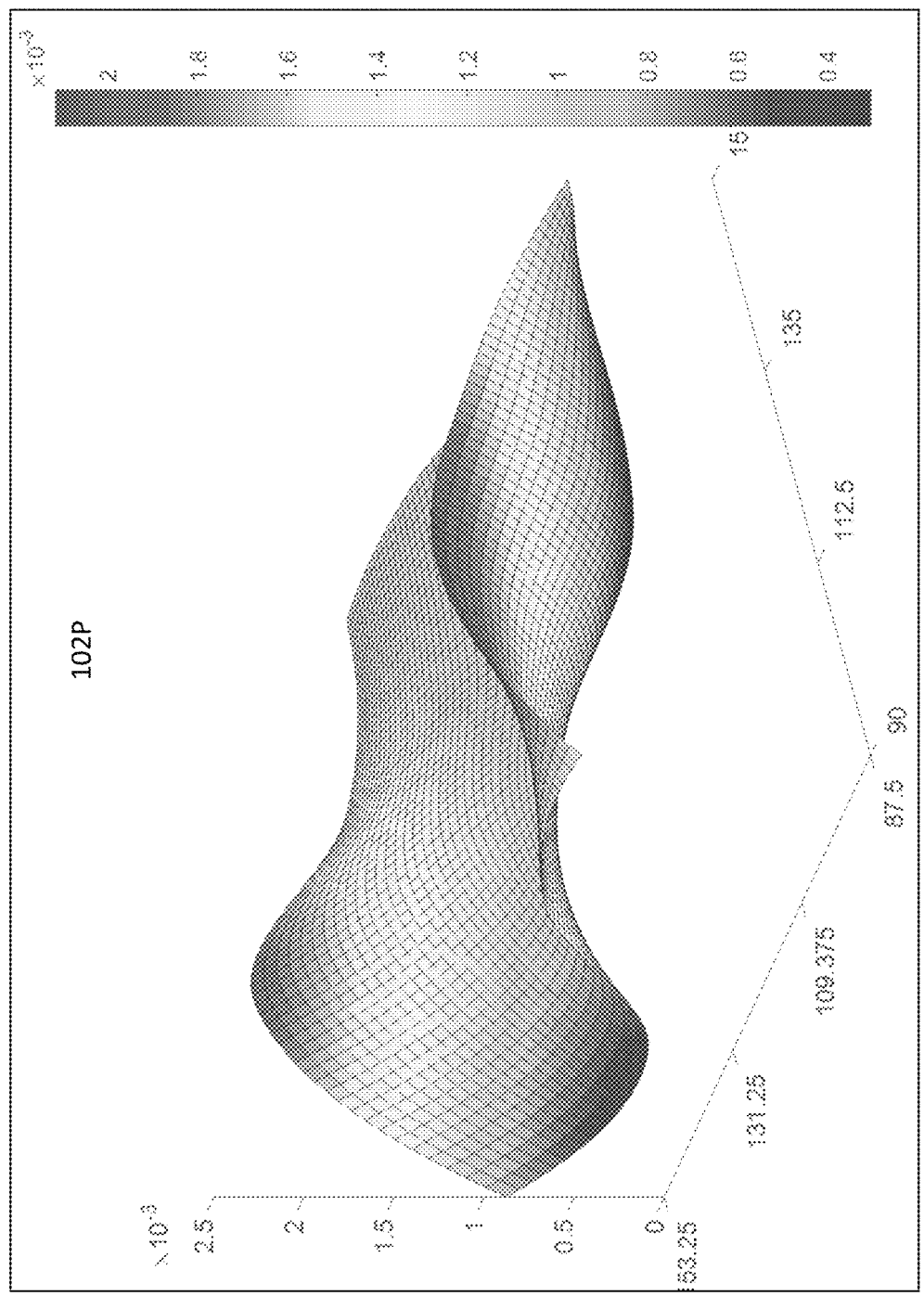
Figure 1Q:
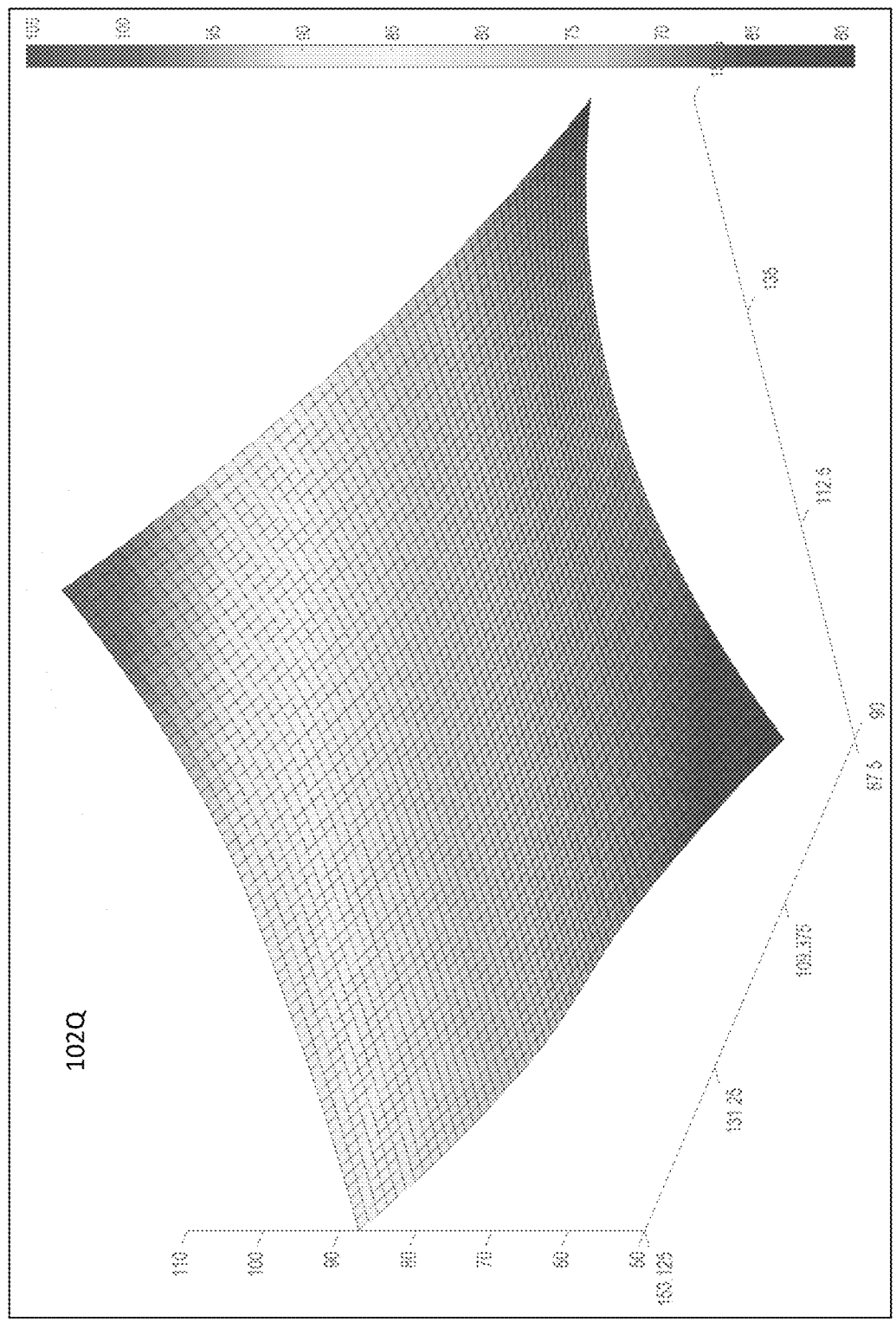
Figure 1R:
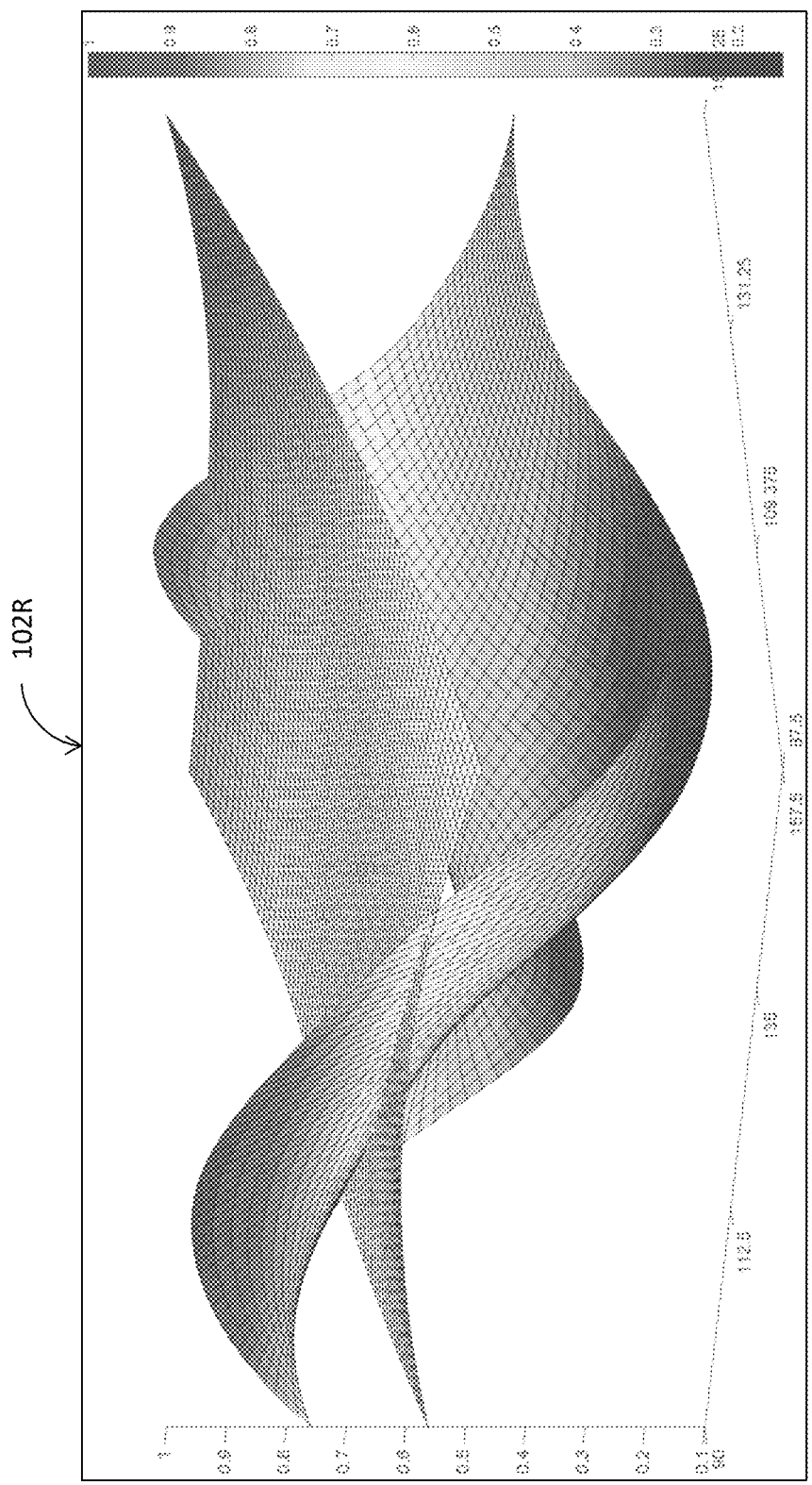

FIGS. 1D-1R illustrate some examples of the application of various techniques described herein to the simplified electronic design in one or more embodiments. More specifically, FIG. 1D illustrates a simplified example of a user interface 102D for a user to configure some modules of the present invention. This simplified user interface 102D includes various fields for the user to input or select various controls of these modules. For example, the simplified user interface 102D includes a field 104D for a user to select the physics domain in which analyses are to be performed. Based on what a user selects or enters, one or more parameters 106D for optimization may be automatically or manually loaded for various modules to generate one or more corresponding optimization maps; and the present invention invokes the corresponding modules (e.g., analysis modules) for the selected physics domain.

The simplified user interface 102D further includes the optimization objectives 108D (e.g., EMI radiation power, EMI radiation efficiency, gain, temperature, etc.) and the optimization threshold or mask (e.g., maximum, minimum, thresholds, etc. of an optimization objective). In addition, the simplified user interface further includes a field 110D for a user to input the optimization threshold. For example, a user may require that maximum of the EMI radiation power of the electronic device is not to exceed the threshold of 1.0E-4 by selecting "Max" and "EMI Radiation Power" in 108D and by entering 1.0E-4 in 110D.

FIG. 1E illustrates a similar, simplified example user interface 102E. In this example, the user selects the thermal behavior in 104E in the user interface 102E which automatically invoke various modules (e.g., a heat transfer analysis engine) accordingly. The user further specifies the analysis tolerance 106E within which the analysis is deemed as converged. In the example of optimizing the placement of an electronic design, which also acts as a heat source, the user may further constrain the state space for the present invention to sweep or sample in the determination of grids. For example, the user may constrain (along one or more axes) where the sampling or sweeping module starts and ends sampling or sweeping as well as the steps of sampling or sweeping via the interface option menu 108E. The present thus allows a user to custom constrain the state space for the present invention to explore. The user may also specify the optimization threshold 110E for an optimization objective (e.g., temperature).

FIG. 1F illustrates a converged thermal contour plot 100F generated by, for example, a thermal analysis module (406) and an adaptive module (404). Each dot represents a grid at which the electronic device is placed, and one or more thermal analyses are performed for the electronic design having the electronic device located at this grid. As FIG. 1F illustrates, the initial grids may be set to a set of coarse grids such as those in an example window 104. The present invention invokes an adaptive module (404) to intelligently refine the initial grids by, for example, adding adaptive grids in regions where analysis results of two adjacent grids exhibit larger than acceptable differences or changes (e.g., the gradient of the analysis results exceeds a threshold). The final grids as illustrated in FIG. 1F reflects the addition of adaptive grids such as those in, for example, window 102F to intelligently refine the initial grids in, for example, window 104F until the analysis results of two adjacent grids become well behaved and no longer exhibit larger than acceptable differences or changes. In this example illustrated in FIG. 1F, a node 106F represents a sampled or swept location at which an electronic device of interest may be placed in the electronic design to generate a model for the electronic design and to perform various analyses or simulations with the model.

FIG. 1G illustrates an example of a thermal optimization map 100G that is generated based on the thermal contour plot (100F) illustrated in FIG. 1F. Some embodiments identifies the regions in which the optimization objective is satisfied. In the above example where the optimization objective is set to find the locations at which the temperature of the electronic device, when placed at these locations, does not exceed the optimization threshold (75 degrees Celsius). These locations are identified with graphical and/or textual emphasis 102G (e.g., by using a highlighted boundary to illustrate these locations) in the thermal optimization map.

The graphical emphasis may further be associated with textual information such as the optimization threshold (75 degrees Celsius).

FIG. 1H illustrates some further processing of or a different version 100H of the thermal optimization map. In this example, some embodiments either extract the safe regions from the thermal optimization map 100G to generate another optimization map 100H as illustrated in FIG. 1H or suppress the display of the portion of the thermal optimization map (100G) that is not considered a "safe region". These embodiments may further compute the respective "area" and the respective quality factor (Q) of a safe region (e.g., 102H, 104H, or 106H). These safe regions illustrate the collection of locations at which the electronic device, when placed at these locations, will meet the optimization threshold.

FIG. 1I illustrates further processing of or a different version of the thermal optimization map illustrated in FIG. 1G or FIG. 1H. In this example, some embodiments further computes one or more index values for each sub-region in a safe region. As a result, safe regions 102I, 104I, and 106I are displayed with their respective sets of sub-regions as shown in FIG. 1I. One or more index values of one or more indices may be determined for each or at least some of these sub-regions, and the results of such index values are illustrated in FIG. 1J.

FIG. 1J illustrates the safe region 102J that corresponds to the safe region 102I in FIG. 1I. As it can be clearly seen in FIG. 1J, this safe region 102J includes a plurality of sub-regions, each of which is associated with a quality factor value. The numeric value for a sub-region represents a distance between the center of the sub-region to the nearest boundary beyond which the placement of the electronic device fails to satisfy the optimization threshold (e.g., temperature is lower than 75 degrees Celsius). Therefore, a smaller index value indicates that the corresponding location in this sub-region is less stable because a smaller deviation (e.g., caused by manufacturing tolerances) from this corresponding location may cause the device to fall within an unacceptable region that fails to satisfy the optimization threshold. Therefore, these individual index values may be used to more precisely select a more robust (e.g., less prone to manufacture fluctuations or tolerances) location for the electronic device. In FIG. 1J, sub-regions showing "NaN" represent sub-regions outside the safe region 102I. In some of these embodiments, the determination of sub-regions outside a safe region is skipped to further conserve computational resource. In some other embodiments, the determination of one or more sub-regions (e.g., those within a halo around or a certain distance from the boundary of the safe region) is nevertheless performed.

FIG. 1K illustrates a similar contour plot 100K as FIG. 1F to demonstrate the intelligent refinement of the initial grids with adaptive grids. The difference between FIG. 1K and FIG. 1F is that FIG. 1F illustrates a converged thermal contour, whereas FIG. 1K illustrates a converged EMI contour plot 100K. FIG. 1K may also start with a coarse set of initial grids that is adaptively refined to exhibit the non-uniform grids as shown in FIG. 1K. Also, FIG. 1K illustrates the EMI radiation power (e.g., EMI radiation power determined by EMI simulation) for the electronic device when the electronic device is placed each grid. The contour plot may be generated and colored as shown based on the optimization threshold, like the thermal contour plot in FIG. 1F.

FIG. 1L illustrates a similar, simplified example user interface 102L that is similar to that in FIG. 1E. In this example, the user selects the EMI behavior in 104L in the user interface 102L which automatically invoke various modules (e.g., an EMI analysis engine) accordingly. The user further specifies the analysis tolerance 106L within which the analysis is deemed as converged. In the example of optimizing the placement of an electronic design, which also acts as an EMI source, the user may further constrain the state space for the present invention to sweep or sample in the determination of grids. For example, the user may constrain (along one or more axes) where the sampling or sweeping module starts and ends sampling or sweeping as well as the steps of sampling or sweeping via the interface option menu 108L. The present thus allows a user to custom constrain the state space for the present invention to explore. The user may also specify the optimization threshold value 110L (e.g., 1.5E-4) for an optimization objective (e.g., maximum radiation power).

FIG. 1M illustrates an example of an EMI optimization map 100M that is generated based on the EMI contour plot illustrated in FIG. 1K. Some embodiments identifies the regions in which the optimization objective is satisfied. In the above example where the optimization objective is set to find the locations at which the EMI radiation power of the electronic device, when placed at these locations, does not exceed the optimization threshold (1.5E-4). These locations are identified with graphical and/or textual emphasis 102M (e.g., by using a highlighted boundary to illustrate these locations) in the EMI optimization map. The graphical emphasis may further be associated with textual information such as the optimization threshold (e.g., 1.5E-4).

FIG. 1N illustrates some further processing of or a different version 100N of the EMI optimization map. In this example, some embodiments either extract the safe regions from the EMI optimization map 100M to generate another optimization map 100N as illustrated in FIG. 1N or suppress the display of the portion of the thermal optimization map (100M) that is not considered a "safe region". These embodiments may further compute the respective "area" and the respective quality factor (Q) of a safe region. These safe regions (e.g., 102N, 104N, 106N, 108N, and 110N) illustrate the collection of locations at which the electronic device, when placed at these locations, will meet the optimization threshold (e.g., EMI radiation power <1.5E-4).

FIG. 1O illustrates further processing of or a different version 100O of the thermal optimization map illustrated in FIG. 1M or FIG. 1N. In this example, some embodiments further computes one or more index values for each sub-region in a safe region. As a result, safe regions 102O, 104O, 106O, 108O, and 110O are displayed with their respective sets of sub-regions as shown in FIG. 1O. One or more index values of one or more indices may be determined for each or at least some of these sub-regions.

FIG. 1P illustrates a three-dimensional surface plot 102P of, for example, an EMI far field radiation power contour plot, as opposed to a two-dimensional contour plot in FIG. 1M. This three-dimensionality may be caused by, for example, optimizing a parameter (e.g., location of the electronic device) in a three-dimensional space or optimizing more than one parameter that forms a state space in the three-dimensional space.

FIG. 1Q illustrates a three-dimensional surface plot 102Q of, for example, a temperature contour plot, as opposed to a two-dimensional contour plot in FIG. 1G. Similar to FIG. 1P, this three-dimensionality may also be caused by, for example, optimizing a parameter (e.g., location of the electronic device) in a three-dimensional space (e.g., optimizing the locations of the electronic device in a three-dimensional enclosure) or optimizing more than one parameter that forms a state space in the three-dimensional space. FIG. 1R illustrates a superposition of the normalized three-dimensional surface plot 102R in FIG. 1P and the normalized three-dimensional surface plot in FIG. 1Q.

Figure 2:
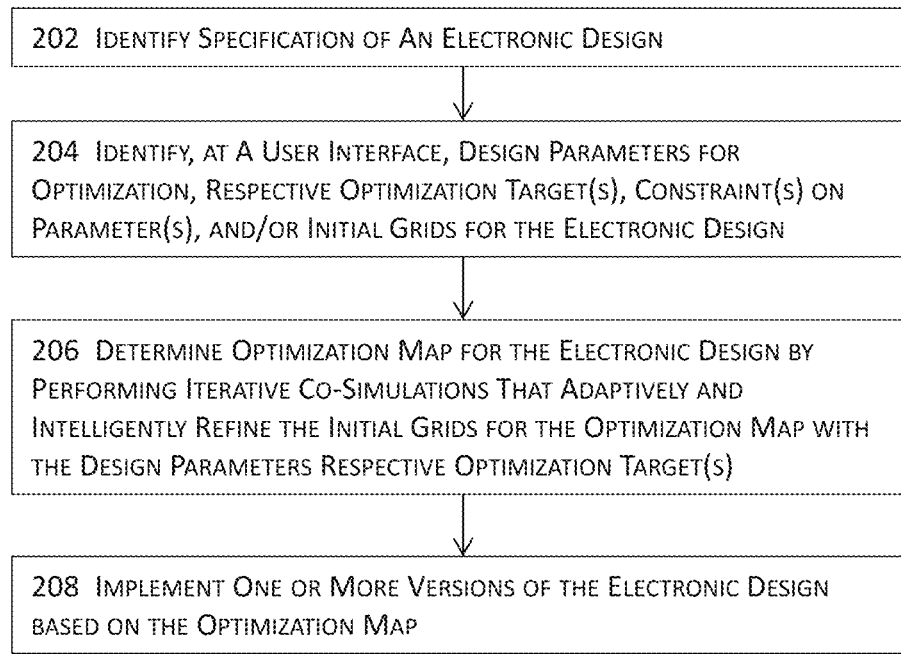
FIG. 2 illustrates a high level block diagram for implementing an electronic design with optimization maps in one or more embodiments.

FIG. 2 illustrates a high level block diagram for implementing an electronic design with optimization maps in one or more embodiments. Some embodiments identify a specification of an electronic design at 202. The implementation of the electronic design may be subject to various requirements for multiple physics domains such as electromagnetics, mechanics, and thermal sciences. Furthermore, the electronic design may include, for example, an integrated circuit (IC) or a portion thereof, an IC package design, a PCB (printed circuit board) design including one or more IC packages, a plurality of discrete circuit components, etc., an electronic system such as a computing system, an automobile electronic control unit (ECU), etc., a rack of electronic systems such as a server rack, etc., or any other electronic designs that are subject to the physics of multiple physics domains in these embodiments.

In some embodiments, a specification of an electronic design may include, for example, a layout or a portion thereof of the electronic design. In some other embodiments, a specification of an electronic design may include, for example, a list of design requirements such as the dimensions or ranges of dimensions, the IP (intellectual property) blocks to use, the performance specification, power requirements, etc. yet does not include any design data that is usually contained in a schematic or layout of the electronic design. Therefore, the present invention applies with full and equal effects to design tasks ranging from concept and feasibility studies, floorplanning, layout, post-layout optimization, all the way to final verification (e.g., design closure, sign-off, etc.) so that the electronic design can be sent to the manufacturers to facilitate the actual manufacturing or fabrication of the underlying electronic circuits or system.

One or more parameters for optimization may be identified at a user interface at 204. These one or more parameters may include, for example, geometries, locations, and/or materials of one or more electronic circuit components or a portion thereof, various properties of an electronic circuit component, or any other information, attributes, characteristics, or properties pertaining to analyses of the underlying electronic design in multiple physics domains. A parameter for optimization is one that some techniques optimize in the construction for an optimization map for the parameter. For example, in a thermal analysis that determines the impact of the location of an electronic device on the temperature distribution in the electronic design, some techniques may identify the location of the electronic device in the electronic design as a parameter for optimization and build an optimization map to delineate the impact of placing the electronic device at different locations on the thermal behavior (e.g., temperature distribution) in the electronic design.

With the one or more parameters identified at 204, initial grids may also be determined or identified at 204. The initial grids represent sampled values of an identified parameter. In the above example where the location of an electronic device is identified as a parameter for optimization, the initial grids may include a set of locations in the electronic design. The present invention then places the electronic device at one or more grids in the initial grids and analyze the electronic design with appropriate analysis tools for the physics domain of interest to determine the behavior of the electronic design with respect to the electronic device at such one or more grids. The initial grids may be initially identified as a coarse set of grids because some techniques described herein intelligently refine the initial grids by adding adaptive grids to provide accurate analysis results with sufficient resolution.

In some embodiments, one or more optimization targets for and/or constraints or thresholds on the one or more parameters may also be identified at 204. In the aforementioned example described immediately above, some embodiments may identify temperature as an optimization target may further identify a constraint for the optimization target. For example, a constraint or threshold of "not to exceed 75 degrees Celsius" may be identified as the corresponding optimization target, temperature, in this case. More details about identifying design parameters, optimization targets, and optimization constraints or thresholds are described below with reference to FIG. 3A.

Constraints or thresholds for an optimization target may be of different forms. For example, a constraint or threshold may impose the extreme value (e.g., maximum or minimum) for an optimization target or a range within which the optimization target is considered satisfied. These constraints or thresholds may be further referenced in plotting and graphically distinguishing local values of the optimization target across the electronic design in the generation of or updates to the corresponding optimization map. At 206, an optimization map may be determined (e.g., generated anew or updated from an existing optimization map) at least by performing one or more co-simulations that adaptively and intelligently refine the initial grids for the optimization map. In some embodiments, the optimization map may be determined at 206 with respect to the one or more design parameters and their corresponding optimization targets and constraints or thresholds identified at 204. More details about determining an optimization map are described below with reference to FIGS. 3B-3C.

With the optimization map determined at 206, some embodiments use the optimization map to guide the implementation of one or more versions of the electronic design at 208. For example, ECU designer may use a first optimization map for thermal behaviors and a second optimization map for EMI (electromagnetic interferences) behaviors to device a first ECU for a particular model of vehicles of an automobile manufacturer and a second ECU for another model of vehicles of the same manufacturer or a different manufacturer.

Figure 3A:
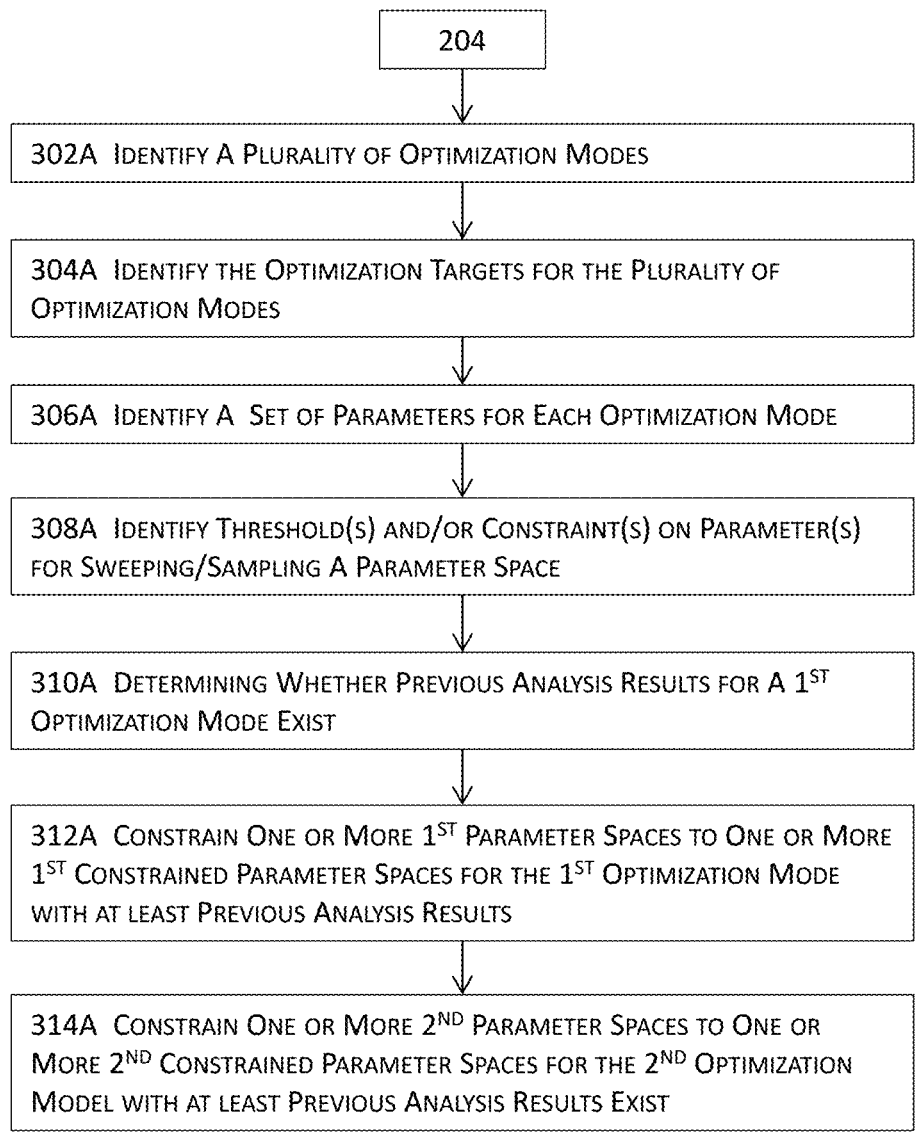
FIGS. 3A-3C illustrate more details about a portion of the high level block diagram illustrated in FIG. 2 in one or more embodiments.
Figure 3B:
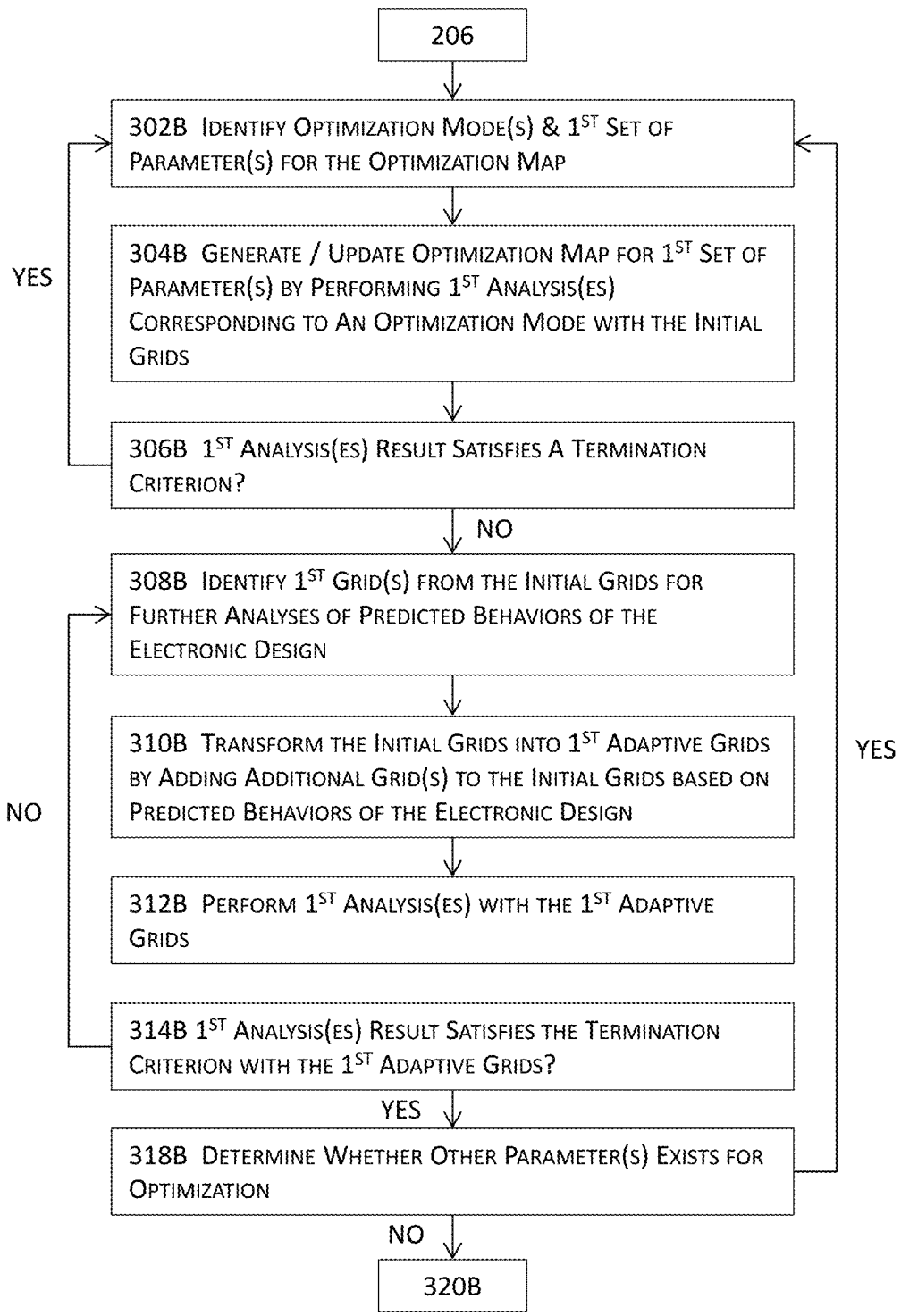
Figure 3C:
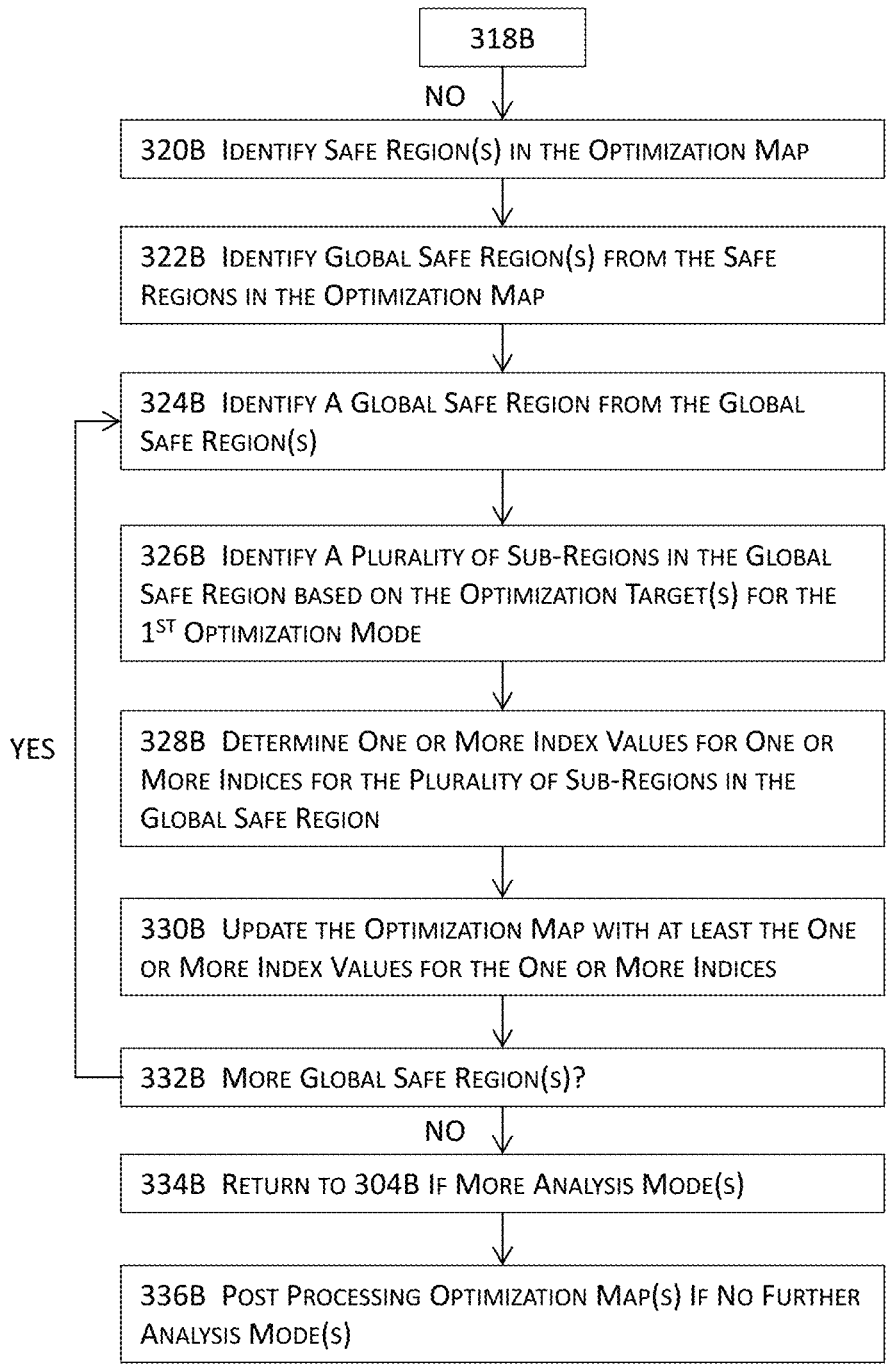

FIGS. 3A-3C illustrate more details about a portion of the high level block diagram illustrated in FIG. 2 in one or more embodiments. More specifically, FIG. 3A illustrates more details about identifying design parameters, optimization targets, and optimization constraints or thresholds (204) of FIG. 2. In some embodiments, a plurality of optimization modes that respectively correspond to their corresponding physics domains may be identified at 302A. For example, a thermal optimization mode and an EMI optimization mode may be identified at 302A. With the identification of an optimization mode, these techniques automatically invoke (and execute, if necessary) a corresponding set of tools for the identified optimization mode. For example, some embodiments automatically invoke one or more thermal analysis modules in response to the identification of a thermal optimization mode. One or more fluid analysis modules may be invoked in response to an identification of a fluid optimization mode; and one or more electromagnetic analysis modules may be automatically invoked in response to an identification of an EM optimization mode.

For each identified optimization mode, one or more corresponding optimization targets may be identified at 304A. For example, an EM radiation power, EM radiation efficiency, gains, etc. may be identified as the optimization targets for an EM optimization mode at 304A. Similarly, temperatures, heat fluxes, etc. or any other characteristics derived therefrom (e.g., temperature gradients, resultant heat flux, etc.) may also be identified as the optimization targets for a thermal optimization mode.

A set of one or more parameters may be identified at 306A for each optimization mode. Some embodiments sweep or sample the parameter space of each parameter to determine a plurality of discrete values for the aforementioned initial grids. For example, when the location of an electronic device is identified at 306A as a parameter for optimization, these embodiments sample or sweep the design space of the underlying electronic design to identify a plurality of locations at each of which the electronic device may be placed during the implementation of the electronic design. The plurality of locations may then be identified as the initial grids for either or both a thermal optimization mode and an EM optimization mode. As another example, when the choice of materials is identified as a parameter for a thermal optimization mode, some embodiments identify a common characteristic (e.g., thermal conductivity) that is common to these materials and pertains to subsequent thermal analyses as a parameter and sample or sweep the parameter space to determine a plurality of discrete thermal conductivity values as the initial grids.

Parameters may or may not be individually optimized so the parameter space may or may not necessarily be spanned by a single parameter. Rather, the parameter space defined by multiple parameters (e.g., a combinatorial space defined by multiple parameters) may be sampled or swept together in some embodiments. In these embodiments, the parameter space defined by multiple parameters constitutes a higher-dimension space. For the ease of illustration and explanation, the examples described in the present invention are confined to individual sampling or sweeping. Nonetheless the description and illustration of such individual sample or sweeping shall not be considered or interpreted as limiting the scope of the claims or other embodiments where a parameter space is defined by multiple parameters.

One or more constraints may be identified at 308A for an identified parameter. For example, a threshold of 75 degrees Celsius may be identified at 308A for a temperature parameter in a thermal optimization mode; and a threshold of 1.5E-04 dB may be identified at 308A for an EM parameter in an EM optimization mode. One or more constraints may further be optionally identified at 308A for a parameter. These one or more constraints may be automatically identified and imposed or manually by a user. For example, with a previous thermal analysis results identifying some safe regions for the placement of an electronic device in an electronic design, the data pertaining to these safe regions may be used as constraints on subsequent thermal analyses in some embodiments.

Some of these embodiments may further construct a dynamic filter with the data pertaining to these safe regions and impose this dynamic filter as an additional constraint on a subsequent EM optimization that determines the safe regions to place the electronic device, which may act as an EMI source or may be more susceptible to EMI, in the electronic design. In these latter embodiments, the thermal analysis data is used to construct the dynamic filter and impose the dynamic filter on the subsequent EM optimization because if the thermal optimization data already dictates that the electronic device can only be placed within these safe regions in the electronic design, the subsequent EM optimization need not sample or sweep the other area outside these thermal safe regions. On the other hand, if no viable solutions can be determined for the EM optimization, the fundamental design concept of this electronic design may be problematic or the optimization thresholds are too strict so either the electronic design needs to be revamped, or the optimization thresholds need to be relaxed for the co-optimization to find a viable solution that satisfies the requirements of both the thermal optimization and the EM optimization.

With the optimization modes, optimization targets, optimization thresholds, and optionally the optimization constraints identified, an analysis may be performed for each optimization mode based on the initial grids to generate analysis results. If the analysis results exhibit large variances between the grids (e.g., the temperature gradient between two adjacent grids exceeds a limit such as 2 degrees Celsius), the initial grids are adaptively refined, and one or more additional analyses are performed. In some embodiments where an analysis is to be performed, a determination may be made at 310A to determine whether previous analysis results exist. These previous analysis results may be generated in one or more previous analyses for the same optimization mode or even for a different optimization mode.

If it is determined at 310A that previous analysis results exist for the first optimization mode, one or more parameter spaces for the first optimization mode may be further constrained by using the data from the previous analysis results. That is, the data from any prior runs of analyses for the same optimization mode may be used to further constrain the parameter space for optimization in the same optimization mode at 312A. The aforementioned example of constructing a dynamic filter that may be imposed as a constraint in the description of 308A demonstrates constraining the parameter space for an optimization mode with previous analysis data in the same optimization mode.

As described above, so long as different modes of optimization share a common parameter, the previous analysis data may also be used to constraint the parameter space in a different optimization mode. Therefore, if it is determined at 310A that previous analysis results exist for the first optimization mode, one or more parameter spaces for the second optimization mode may also be further constrained by using the data from the previous analysis results for the first optimization mode at 314A.

FIGS. 3B-3C illustrate more details about determining an optimization map (206) of FIG. 2. Some embodiments identify one or more optimization modes and a first set of optimization parameters at 302B. The first optimization map may be generated or updated for the first set of parameters at 304B at least by performing one or more analyses that correspond to a first optimization mode with the initial grids identified at 204. For example, one or more EM analyses may be performed for an electronic design with an electronic device placed at each of the initial grids to determine the EMI on the electronic design caused by placing the electronic device at each grid of the initial grids.

The present invention determines, at 306B, whether the analysis results of the one or more analysis performed at 304B satisfy a termination criterion. For example, the analysis results may be examined by an analysis module to determine whether the results exhibit gradients that exceed one or more threshold values. A negative determination indicates a smooth transition in the analysis results between grids. In this case, the process returns to 302B to identify another optimization mode and the corresponding set of parameters for optimization.

On the other hand, an affirmative determination indicates that the analysis results change overly rapidly between, for example, two immediately neighboring grids. In this latter case, the process proceeds to 308B to further identify one or more first grids from the initial grids for further analyses of the predicted behaviors of the electronic design. In these embodiments, the present invention may identify the grids that correspond to results having larger than an acceptable threshold limit at 308B. For example, if it is determined that the predicted EMI readings between two grids change overly rapidly, these two grids may be identified at 308B for further analyses.

The initial grids used to generate the initial analysis results may be transformed at 310B into first adaptive grids by adding one or more additional grids to the initial grids based at least in part upon the predicted behaviors of the electronic design. For example, some embodiments may first determine a gradient between two adjacent grids and identify a pair of adjacent grids that corresponds to larger than acceptable gradient at 308B. One or more additional grids may be added between these two grids in the exact or approximate direction of the gradient (or the reverse direction). With these one or more additional grids that are intelligently and adaptively added to the initial grids, the first adaptive grids now include more grids in areas that exhibit larger than acceptable variances (e.g., overly rapid changes) and thus provide a finer resolution into such areas.

At 312B, one or more first analyses are performed on the electronic design but not with the first adaptive grids having the one or more additional grids introduced at 310B. A determination may be similarly made at 314B to determine whether the analysis results obtained at 312B satisfy the termination criterion in an identical or substantially similar manner as that for 306B. If the determination is affirmative, the process proceeds to 318B. Otherwise the process returns to 308B to identify more grids that exhibit larger than acceptable variances.

At 318B, another determination may be made to decide whether another parameter exists for optimization in the first optimization mode. If the determination is affirmative, the process returns to 302B to identify the next parameter and repeats the process 302B-318B until all parameters have been similarly or identically processed. As describe above, parameters may or may not be individually optimized so the parameter space may or may not necessarily be spanned by a single parameter. Rather, the parameter space defined by multiple parameters (e.g., a combinatorial space defined by multiple parameters) may be sampled or swept together in some embodiments.

With all the parameters processed to generate well-behaved analysis results that provide sufficient resolution for the predicted behaviors of the electronic design, the well-behaved analysis results may be used to generate an optimization map that may further overlay the final set of grids atop the analysis results (e.g., FIGS. 1F and 1K). Moreover, one or more safe regions may be identified at 320B. A safe region indicates the region in which the optimization targets are satisfied. For example, if the optimization target is that the temperature is not to exceed 75 degree Celsius in FIGS. 1H-1G, the area where the electronic device is placed so that the predicted temperature does not exceed 75 degrees Celsius may be identified at 320B.

A global safe region may be identified from these one or more safe regions in the optimization map at 322B in some embodiments. A global safe region may represent the safe region that has the best quality factor. Moreover, a quality factor may be determined by the following formulae that measures the ratio between the elevation difference in the contour plot (e.g., FIGS. 1F, 1G, 1H-1I, 1K, 1M-1R) and the distance from the local minimum to the closest point on the contour line corresponding to the optimization threshold:

$$\text{quality factor} = \frac{\text{Optimizatio Threshold} - MinimumValue}{(MinimumDistance(MinimumLocation, ThresholdContour)},$$

where MinimumValue denotes the local minimum value (e.g., minimum EMI value) of each safe region; MinimjmLocation denotes the location of the local minimum of a safe region; ThresholdContour denotes the line segment(s) surrounding the safe region. In some embodiments, the one or more safe regions may be ranked or prioritized according to their respective qualify factor values. Some examples of the quality factor values are demonstrated in FIGS. 1H and 1N-1O described above.

At 326B, a plurality of sub-regions may be identified in the global safe region based at least in part upon the optimization target(s) for the $1^{st}$ optimization mode. Some examples of such sub-regions are illustrated in FIGS. 1I-1J and 1O and described above. One or more index values for one or more indices may be determined at 328B for the plurality of sub-regions in a safe region. These one or more indices may include the quality factor described above, although for a sub-region at 328B rather that for the entire safe region.

In addition or in the alternative, these one or more indices may include a respective area of a sub-region and/or an achievable maximum and/or minimum value for the optimization target upon which the optimization map is built. Moreover, the one or more indices may include a safe distance from a region (e.g., the entire safe region or a sub-region therein) to the boundary of an acceptable threshold in the optimization map. It shall be noted that these one or more indices may be determined for an entire safe region or for a sub-region therein by using the same concept and formulation. An example of a plurality of sub-regions for a safe region is illustrated in FIG. 1J and described above.

The first optimization map may be updated at 330B with at least the one or more index values of one or more indices determined at 328B. The plurality of sub-regions and the associated index value(s) provide a fine-grain control and guidance for the implementation of the electronic design. In the example illustrated in FIG. 1J where the index values therein indicate the safe distance to the acceptable boundary that corresponds to the optimization threshold for an optimization target (e.g., the boundary enclosing the region where the predicted EMI reading is less than 1.5E-04 dB), a smaller index value in a sub-region indicates that the corresponding location in this sub-region is less stable because a smaller deviation (e.g., caused by manufacturing tolerances) from this corresponding location may cause the device to fall within an unacceptable region that fails to satisfy the optimization threshold. Therefore, these individual index values for the plurality of sub-regions in a safe region may be used to provide finer-grain control and to more precisely select a more robust (e.g., less prone to manufacture fluctuations or tolerances) location for the electronic device.

An optional determination may be made at 332B to decide whether one or more global safe regions exist for similar processing. In some embodiments, the present invention may identify a global safe region that exhibits, for example, the best index value(s) (e.g., the largest area, the best quality factor value, etc.) In some other embodiments, the present invention may similarly process more than one global safe region to provide more options for the implementation of the electronic design. This may be beneficial in an electronic design that must satisfy the requirements of multiple physics domains.

If the determination is affirmative at 332, the process returns to 324B to identify the next global safe region and repeat the processes 324B-332B. Otherwise, the process returns, at 334B, to 304B to determine whether all the optimization modes have been similarly processed to generate their respective optimization maps. Once all the optimization modes have been completed, the optimization maps may be post-processed at 336B as illustrated in various figures described above.

Figure 4:
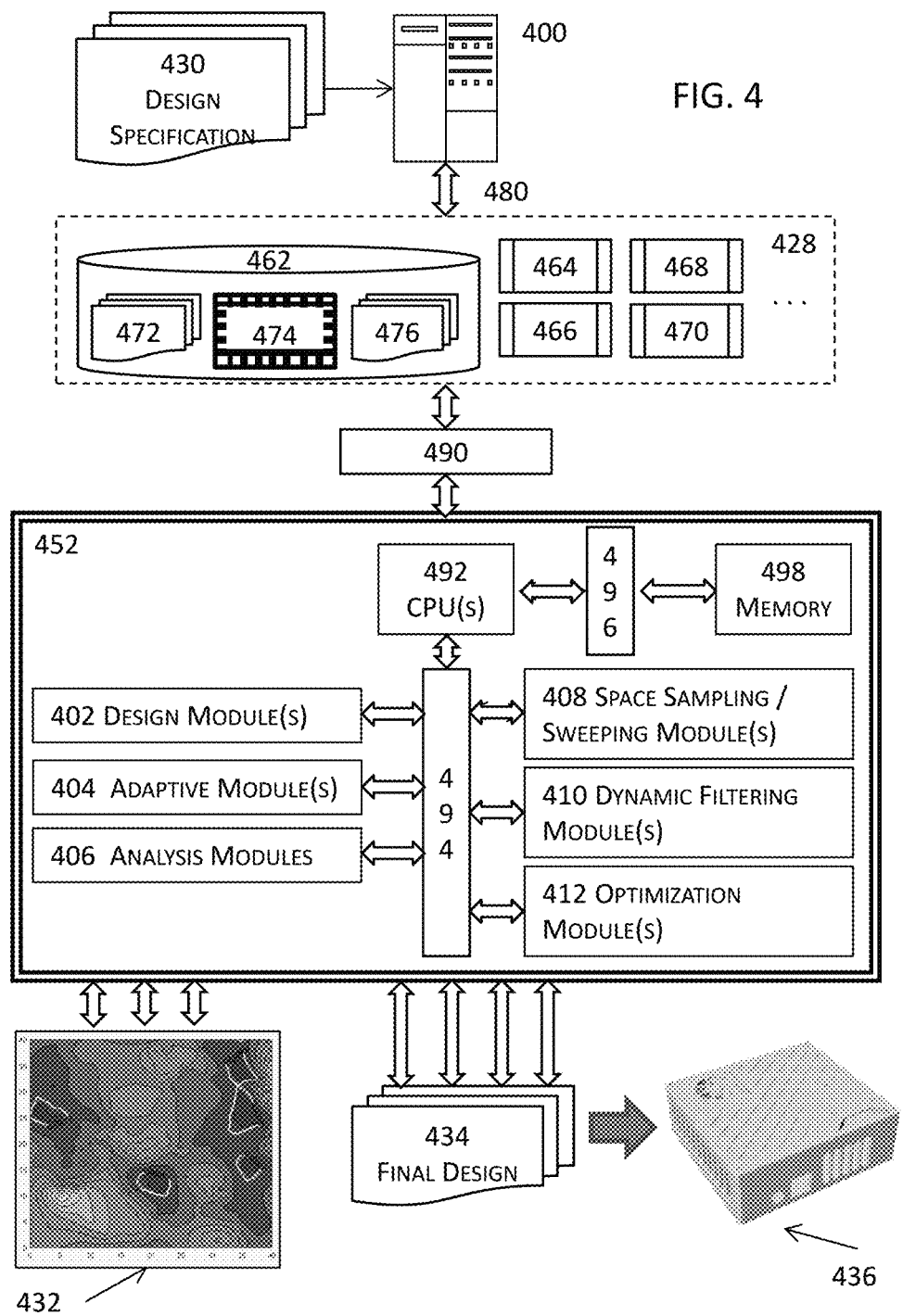
FIG. 4 illustrates an example computing system for implementing an electronic design with optimization maps in one or more embodiments.

FIG. 4 illustrates an example computing system that implements an electronic design with optimization maps in one or more embodiments. More specifically, the computing system 400 in FIG. 4 may comprise one or more computing systems 400, such as a general purpose computer described in the System Architecture Overview section to implement one or more special proposes. The illustrative system in FIG. 4 may include an Internet-based computing platform providing a shared pool of configurable computer processing resources (e.g., computer networks, servers, storage, applications, services, etc.) and data to other computers and devices in an ubiquitous, on-demand basis via the Internet. For example, one or more computing resources and/or modules illustrated in FIG. 4 may be located in a cloud computing platform in some embodiments.

In this illustrated system in FIG. 4, one or more computing systems 400 may invoke and execute various modules to identify a specification of an electronic design 430 or a portion thereof. The one or more computing systems 400 then perform various processes described herein to generate one or more optimization maps 432 for the specification of an electronic design 430. One or more design modules (e.g., 402) may reference or use these one or more optimization maps 432 to implement a final design 434 for the specification of an electronic design 430 that may be sent to one or more manufacturers that manufacture the electronic circuits or systems 436.

The one or more computing systems 400 may invoke and execute a plurality of modules, which are specifically programmed and stored at least partially in memory of and functions in conjunction with at least one microprocessor (e.g., 492) or processor core of the one or more computing system s 400, to perform various functions described herein to generate one or more optimization maps 432 for the electronic design 430. For example, the one or more computing systems 400 may execute one or more adaptive modules (404) that intelligently and adaptively refine various sets of grids (e.g., initial grids) into more refined grids. These one or more computing systems 400 may optionally execute one or more reference analysis modules (406) to perform various analyses on the electronic design 430 in multiple physics domains. One or more space sampling or sweeping modules (408) may also be executed to sweep or sample one or more parameter spaces to generate or update various grids referenced in various analyses in multiple physics domains.

One or more dynamic filtering modules 410 may function in conjunction with one or more modules (e.g., an adaptive module 404, a space sampling or sweeping module 408) to filter and constrain one or more parameter space so as to conserve computational resource utilization by preventing, for example, unnecessary sampling or sweep of portions of a parameter space. One or more optimization modules 412 may perform various optimization techniques in conjunction with one or more other modules to determine optimization maps. One or more design modules (e.g., electronic design automation tools, mechanical design modules, etc.)

In some embodiments, the one or more computing systems 400 may invoke various system resources such as the processor(s) or processor core(s), memory, disks, etc. The one or more computing systems 400 may also initiate or interact with other computing systems to access, via a computer bus architecture (e.g., a system bus, a control bus, a data bus, or any combinations thereof), various resources 428 that may comprise a floorplanner, a global routing engine, and/or a detail routing engine 464, a layout editor 466, a design rule checker 468, a verification engine 470, etc. In some embodiments, each design fabric may have its own dedicated, native engines, editors, checkers, etc. mentioned above. In some other embodiments, multiple design fabrics (e.g., an IC package design fabric and an IC design fabric) may use a single unified tool (e.g., a single, unified layout editor) that performs its functions to fulfill the respective needs in these multiple design fabrics.

These various resources 428 may further include, for example, one or more other EDA (electronic design automation) modules such as a schematic tool, a placement tool, a routing tool, verification tools, post-route or post-layout optimization tools, various photolithography tools (e.g., optical proximity correction or OPC tools, phase shift mask or PSM tools, resolution enhancement technology or RET tools, etc.), etc. to prepare the electronic design. Once sign-off and/or design closure is achieved, the electronic design (e.g., a modified version of 434 with reduced interferences and disturbances) is finalized for tapeout; and the electronic design is transmitted to mask fabrication equipment for mask preparation and mask writing to produce photomasks that are then used in the actual manufacturing of the electronic circuits represented by the electronic design.

The one or more computing systems 400 may further write to and read from a local or remote (e.g., networked storage device(s)) non-transitory computer accessible storage 462 that stores thereupon data or information such as, but not limited to, one or more databases (474) such as schematic design database(s) or physical design database(s), electronic circuit design specification database(s), techfiles for multiple design fabrics, various statistics, various data, rule decks, various design rules, constraints, etc. (472), or other information or data (476) that may be used to facilitate the performance of various functions to achieve the intended purposes. The one or more databases may also include, for example, one or more data structures for facilitating determination of layout equivalence in multi-fabric electronic designs.

In some embodiments, the computing system 400 may include the various resources 428 such that these various resources may be invoked from within the computing system via a network or a computer bus 480 (e.g., an internet session, an intranet session, a data bus interfacing a microprocessor 492 and the non-transitory computer accessible storage medium 498 or a system bus 490 between a microprocessor 492 and one or more engines in the various resources 428). In some other embodiments, some or all of these various resources may be located remotely from the computing system 400 such that the computing system may access the some or all of these resources via a computer bus 480 and one or more network components.

The computing system may also include one or more modules in the set of modules 452. One or more modules in the set 452 may include or at least function in conjunction with a microprocessor 492 via a computer bus 494 to access or invoke various modules in 452 (e.g., 402-412 described above) in some embodiments. In these embodiments, a single microprocessor 492 may be included in and thus shared among more than one module even when the computing system 400 includes only one microprocessor 492. A microprocessor 492 may further access some non-transitory memory 498 (e.g., random access memory or RAM) via a system bus 496 to read and/or write data during the microprocessor's execution of processes.

The set of modules 452 may also include one or more extraction modules to identify various data or information such as the schematic connectivity from a schematic design, physical design connectivity from a hierarchical physical design, parasitics from a hierarchical physical design, and/or hierarchy information from a hierarchical schematic design and/or a hierarchical physical design. The set of modules 452 may further optionally include one or more signoff modules (not shown) to perform various signoff and design closure tasks to ensure that the electronic design implemented by various techniques described herein may be successfully fabricated while maintaining various performance, cost, reliability, and manufacturability requirements.

For example, the one or more signoff modules may include one or more timing signoff modules to perform timing analyses and timing closure related tasks (e.g., silicon-accurate timing signoff, signal integrity analyses, etc.) to ensure an electronic design meets power, performance, or other requirements before tapeout, one or more signoff parasitic extraction modules to provide silicon-accurate interconnect parasitic extraction and ensure first-pass silicon success, and one or more power signoff modules to perform various power integrity analyses, transistor-level electromigration and IR-drop analyses, or other power and signal integrity analyses with SPICE-level accuracy or better accuracy with SPICE or SPICE-like simulations (e.g., Fast-SPICE, HSPICE, PSPICE, or any other SPICE-based or SPICE-compatible simulations) to ensure an electronic design meets or exceeds power, performance, and/or area goals in some embodiments.

The one or more signoff modules may include one or more physical verification modules (not shown) to perform various design rule checking, layout vs. schematic (LVS), etc. tasks to ensure that an electronic design meets or exceeds various spatial and other physical rules and one or more design for manufacturing (DFM) modules to address physical signoff and electrical variability optimization, correct lithography hotspots, predict silicon contours, improve yield, detect and repair timing and leakage hotspots to achieve variation- and manufacturing-aware signoff and design closure in some of these embodiments.

In addition or in the alternative, the one or more signoff modules may include one or more one or more computational lithography modules (not shown) to provide more accurate post-etch critical dimension accuracy and process windows on silicon, reticle and wafer synthesis, etc. to eliminate errors and/or reduce mask-manufacturing cycle times. One or more of these multi-fabric signoff modules may operate on the electronic design produced or modified with various techniques to be described in the following sections for proper signoff and design closure so that the signoff version of the electronic design may be properly manufactured with first-pass or fewer passes silicon success in some embodiments. In these embodiments, the signoff version of the electronic design produced or modified with various techniques described herein causes the underlying electronic circuit to be manufactured by a foundry or IC (integrated circuit) fabrication facility when the signoff version of the electronic design is forwarded to the foundry or IC fabrication facility that in turn fabricates the requisite photomasks and the eventual electronic circuit.

In some embodiments, the computing system 400 may include the various resources 428 such that these various resources may be invoked from within the computing system via a computer bus 480 (e.g., a data bus interfacing a microprocessor 492 and the non-transitory computer accessible storage medium 498 or a system bus 490 between a microprocessor 492 and one or more engines in the various resources 428). In some other embodiments, some or all of these various resources may be located remotely from the computing system 400 such that the computing system may access the some or all of these resources via a computer bus 480 and one or more network components.

The computing system may also include one or more modules in the set of modules 452. One or more modules in the set 452 may include or at least function in tandem with a microprocessor 492 via a computer bus 494 in some embodiments. In these embodiments, a single microprocessor 492 may be included in and thus shared among more than one module even when the computing system 400 includes only one microprocessor 492. A microprocessor 492 may further access some non-transitory memory 498 (e.g., random access memory or RAM) via a system bus 496 to read and/or write data during the microprocessor's execution of processes.

The one or more computing systems 500 may invoke and execute one or more modules in 528 and/or 552 to perform various functions. Each of these modules may be implemented as a pure hardware implementation (e.g., in the form of firmware, application specific IC, etc.), a pure software implementation, or a combination of hardware and software implementation. In some embodiments where a module is implemented at least partially as a software implementation, the module may be stored at least partially in memory (e.g., in random access memory, instruction cache, etc.) of at least one of these one or more computing systems 500 for execution.

System Architecture Overview

FIG. 5 illustrates a computerized system on which a method for implementing an electronic design with optimization maps may be implemented. Computer system 500 includes a bus 506 or other communication module for communicating information, which interconnects subsystems and devices, such as processor 507, system memory 508 (e.g., RAM), static storage device 509 (e.g., ROM), disk drive 510 (e.g., magnetic or optical), communication interface 514 (e.g., modem or Ethernet card), display 511 (e.g., CRT or LCD), input device 512 (e.g., keyboard), and cursor control (not shown). The illustrative computing system 500 may include an Internet-based computing platform providing a shared pool of configurable computer processing resources (e.g., computer networks, servers, storage, applications, services, etc.) and data to other computers and devices in an ubiquitous, on-demand basis via the Internet. For example, the computing system 500 may include or may be a part of a cloud computing platform in some embodiments.

According to one embodiment, computer system 500 performs specific operations by one or more processor or processor cores 507 executing one or more sequences of one or more instructions contained in system memory 508. Such instructions may be read into system memory 508 from another computer readable/usable storage medium, such as static storage device 509 or disk drive 510. In alternative embodiments, hard-wired circuitry may be used in place of or in combination with software instructions to implement the invention. Thus, embodiments of the invention are not limited to any specific combination of hardware circuitry and/or software. In one embodiment, the term "logic" shall mean any combination of software or hardware that is used to implement all or part of the invention.

Various actions or processes as described in the preceding paragraphs may be performed by using one or more processors, one or more processor cores, or combination thereof 507, where the one or more processors, one or more processor cores, or combination thereof executes one or more threads. For example, the acts of determination, extraction, stitching, simulating, annotating, analyzing, optimizing, and/or identifying, etc. may be performed by one or more processors, one or more processor cores, or combination thereof. In one embodiment, the parasitic extraction, current solving, current density computation and current or current density verification is done in memory as layout objects or nets are created or modified.

The term "computer readable storage medium" or "computer usable storage medium" as used herein refers to any non-transitory medium that participates in providing instructions to processor 507 for execution. Such a medium may take many forms, including but not limited to, non-volatile media and volatile media. Non-volatile media includes, for example, optical or magnetic disks, such as disk drive 510. Volatile media includes dynamic memory, such as system memory 508. Common forms of computer readable storage media includes, for example, electromechanical disk drives (such as a floppy disk, a flexible disk, or a hard disk), a flash-based, RAM-based (such as SRAM, DRAM, SDRAM, DDR, MRAM, etc.), or any other solid-state drives (SSD), magnetic tape, any other magnetic or magneto-optical medium, CD-ROM, any other optical medium, any other physical medium with patterns of holes, RAM, PROM, EPROM, FLASH-EPROM, any other memory chip or cartridge, or any other medium from which a computer can read.

In an embodiment of the invention, execution of the sequences of instructions to practice the invention is performed by a single computer system 500. According to other embodiments of the invention, two or more computer systems 500 coupled by communication link 515 (e.g., LAN, PTSN, or wireless network) may perform the sequence of instructions required to practice the invention in coordination with one another.

Computer system 500 may transmit and receive messages, data, and instructions, including program (e.g., application code) through communication link 515 and communication interface 514. Received program code may be executed by processor 507 as it is received, and/or stored in disk drive 510, or other non-volatile storage for later execution. In an embodiment, the computer system 500 operates in conjunction with a data storage system 531, e.g., a data storage system 531 that includes a database 532 that is readily accessible by the computer system 500. The computer system 500 communicates with the data storage system 531 through a data interface 533. A data interface 533, which is coupled to the bus 506 (e.g., memory bus, system bus, data bus, etc.), transmits and receives electrical, electromagnetic or optical signals that include data streams representing various types of signal information, e.g., instructions, messages and data. In embodiments of the invention, the functions of the data interface 533 may be performed by the communication interface 514.

In the foregoing specification, the invention has been described with reference to specific embodiments thereof. It will, however, be evident that various modifications and changes may be made thereto without departing from the broader spirit and scope of the invention. For example, the above-described process flows are described with reference to a particular ordering of process actions. However, the ordering of many of the described process actions may be changed without affecting the scope or operation of the invention. The specification and drawings are, accordingly, to be regarded in an illustrative rather than restrictive sense.

We claim:

1. A computer implemented method for implementing an electronic design with optimization maps, comprising:

identifying a specification of an electronic design;

identifying a parameter for optimization, at least one optimization target for the parameter, and initial grids for the electronic design;

determining, at one or more optimization modules that are stored at least partially in memory of and function in conjunction with at least one microprocessor of a computing system, an optimization map for the electronic design at least by:

constraining a state space into a constrained state space of the parameter for determining one or more discrete values for the initial grids; and performing one or more analyses that refine the initial grids for the optimization map with respect to the parameter and the at least one optimization target based at least in part the one or more discrete values; and implementing the electronic design based at least in part upon the optimization map, wherein the optimization map corresponds to the one or more discrete values.

2. The computer implemented method of claim 1, wherein identifying the parameter, the at least one optimization target, and the initial grids comprises:

identifying a plurality of optimization modes for the electronic design; and identifying a plurality of optimization targets including the at least one optimization target for the plurality of optimization modes.

3. The computer implemented method of claim 2, wherein identifying the parameter, the at least one optimization target, and the initial grids comprises:

identifying a set of parameters for each optimization mode of the plurality of optimization modes; and identifying a set of thresholds for the set of parameters.

4. The computer implemented method of claim 3, wherein identifying the parameter, the at least one optimization target, and the initial grids comprises:

identifying a set of constraints for the set of parameters.

5. The computer implemented method of claim 3, wherein identifying the parameter, the at least one optimization target, and the initial grids comprises:

determining whether previous analysis results for a first optimization mode exist;

constraining one or more first parameter spaces into one or more first constrained parameter spaces for the first optimization mode with at least the previous analysis results; and constraining one or more second parameter spaces into one or more second constrained parameter spaces for a second optimization mode with at least the previous analysis results.

6. The computer implemented method of claim 1, wherein determining the optimization map comprises:
   identifying an optimization mode and the at least one parameter for optimization for the optimization map; and
   generating or updating the optimization map for the at least one parameter for optimization at least by performing one or more first analyses that correspond to an optimization mode with the initial grids.

7. The computer implemented method of claim 6, wherein determining the optimization map comprises:
   determining whether the one or more first analyses satisfy a termination criterion;
   when it is determined that the one or more first analyses do not satisfy the termination criterion, identifying first grids from the initial grids for further analyses of predicted behaviors generated by the one or more first analyses for the electronic design;
   when it is determined that the one or more first analyses do not satisfy the termination criterion, transforming the initial grids into first adaptive grids by adding one or more additional grids to the initial grids based in part or in whole upon the predicted behaviors of the electronic design; and
   when it is determined that the one or more first analyses do not satisfy the termination criterion, performing at least one first analysis of the one or more first analyses on the electronic design with the first adaptive grids.

8. The computer implemented method of claim 7, wherein determining the optimization map comprises:
   determining whether analysis results of the at least one first analysis satisfy the termination criterion with the first adaptive grids;
   when it is determined that the at least one first analysis satisfies the termination criterion, determining whether another parameter for optimization exists but has not been processed;
   when it is determined that no other parameters for optimization exist but have not been processed, identifying one or more safe regions in the optimization map; and
   when it is determined that no other parameters for optimization exist but have not been processed, identifying one or more global safe region from the one or more safe regions in the optimization map.

9. The computer implemented method of claim 8, wherein determining the optimization map comprises:
   identify a global safe region from the one or more global safe regions;
   identifying a plurality of sub-regions in the global safe region based at least in part upon the at least one optimization target for the optimization mode; and
   determining one or more index values for one or more indices for the plurality of sub-regions or for the global safe region.

10. The computer implemented method of claim 9, wherein determining the optimization map comprises:
    updating the optimization map with at least the one or more index values for the one or more indices; and
    determining whether one or more other global safe regions exist but have not been processed.

11. A system for implementing an electronic design with optimization maps, comprising:

non-transitory computer accessible storage medium storing thereupon program code; and
one or more one or more embedded circuit modules stored at least partially in memory of and functioning in conjunction with at least one microprocessor of one or more computing systems, wherein the at least one microprocessor of the one or more computing systems is configured to execute at least the one or more optimization modules at least to:
   identify a specification of an electronic design;
   identify a parameter for optimization, at least one optimization target for the parameter, and initial grids for the electronic design;
   determine an optimization map for the electronic design at least by:
      constraining a state space into a constrained state space of the parameter for determining one or more discrete values for the initial grids; and
      performing one or more analyses that refine the initial grids for the optimization map with respect to the parameter and the at least one optimization target based at least in part the one or more discrete values; and
   implement the electronic design based at least in part upon the optimization map, wherein the optimization map corresponds to the one or more discrete values.

12. The system for claim 11, wherein the at least one micro-processor that is configured to execute at least the one or more optimization modules is further configured to:
   identify a plurality of optimization modes for the electronic design;
   identify a plurality of optimization targets including the at least one optimization target for the plurality of optimization modes;
   identify a set of parameters for each optimization mode of the plurality of optimization modes; and
   identify a set of thresholds for the set of parameters.

13. The system for claim 12, wherein the at least one micro-processor that is configured to execute at least the one or more optimization modules is further configured to:
   identify a set of constraints for the set of parameters;
   determine whether previous analysis results for a first optimization mode exist;
   constrain one or more first parameter spaces into one or more first constrained parameter spaces for the first optimization mode with at least the previous analysis results;
   constrain one or more second parameter spaces into one or more second constrained parameter spaces for a second optimization mode with at least the previous analysis results;
   identify an optimization mode and the at least one parameter for optimization for the optimization map; and
   generate or update the optimization map for the at least one parameter for optimization at least by performing one or more first analyses that correspond to an optimization mode with the initial grids.

14. The system for claim 12, wherein the at least one micro-processor that is configured to execute at least the one or more optimization modules is further configured to:
   determine whether the one or more first analyses satisfy a termination criterion;
   when it is determined that the one or more first analyses do not satisfy the termination criterion, identify first grids from the initial grids for further analyses of predicted behaviors generated by the one or more first analyses for the electronic design;

when it is determined that the one or more first analyses do not satisfy the termination criterion, transform the initial grids into first adaptive grids by adding one or more additional grids to the initial grids based in part or in whole upon the predicted behaviors of the electronic design; and when it is determined that the one or more first analyses do not satisfy the termination criterion, perform at least one first analysis of the one or more first analyses on the electronic design with the first adaptive grids.

15. The system for claim 14, wherein the at least one micro-processor that is configured to execute at least the one or more optimization modules is further configured to:

determine whether analysis results of the at least one first analysis satisfy the termination criterion with the first adaptive grids;

when it is determined that the at least one first analysis satisfies the termination criterion, determine whether another parameter for optimization exists but has not been processed;

when it is determined that no other parameters for optimization exist but have not been processed, identify one or more safe regions in the optimization map; and when it is determined that no other parameters for optimization exist but have not been processed, identify one or more global safe region from the one or more safe regions in the optimization map.

16. An article of manufacture comprising a non-transitory computer accessible storage medium having stored thereupon a sequence of instructions which, when executed by at least one processor or at least one processor core executing one or more threads, causes the at least one processor or the at least one processor core to perform a set of acts for implementing an electronic design with optimization maps, the set of acts comprising:

identifying a specification of an electronic design;

identifying a parameter for optimization, at least one optimization target for the parameter, and initial grids for the electronic design;

determining, at one or more optimization modules that are stored at least partially in memory of and function in conjunction with at least one microprocessor of a computing system, an optimization map for the electronic design at least by:

constraining a state space into a constrained state space of the parameter for determining one or more discrete values for the initial grids; and performing one or more analyses that refine the initial grids for the optimization map with respect to the parameter and the at least one optimization target based at least in part the one or more discrete values; and implementing the electronic design based at least in part upon the optimization map, wherein the optimization map corresponds to the one or more discrete values.

17. The article of manufacture of claim 16, the set of acts further comprising:

identifying an optimization mode and the at least one parameter for optimization for the optimization map;

generating or updating the optimization map for the at least one parameter for optimization at least by performing one or more first analyses that correspond to an optimization mode with the initial grids;

determining whether the one or more first analyses satisfy a termination criterion;

when it is determined that the one or more first analyses do not satisfy the termination criterion, identifying first grids from the initial grids for further analyses of predicted behaviors generated by the one or more first analyses for the electronic design;

when it is determined that the one or more first analyses do not satisfy the termination criterion, transforming the initial grids into first adaptive grids by adding one or more additional grids to the initial grids based in part or in whole upon the predicted behaviors of the electronic design; and when it is determined that the one or more first analyses do not satisfy the termination criterion, performing at least one first analysis of the one or more first analyses on the electronic design with the first adaptive grids.

18. The article of manufacture of claim 17, the set of acts further comprising:

determining whether analysis results of the at least one first analysis satisfy the termination criterion with the first adaptive grids;

when it is determined that the at least one first analysis satisfies the termination criterion, determining whether another parameter for optimization exists but has not been processed;

when it is determined that no other parameters for optimization exist but have not been processed, identifying one or more safe regions in the optimization map; and when it is determined that no other parameters for optimization exist but have not been processed, identifying one or more global safe region from the one or more safe regions in the optimization map.

19. The article of manufacture of claim 18, the set of acts further comprising:

identify a global safe region from the one or more global safe regions;

identifying a plurality of sub-regions in the global safe region based at least in part upon the at least one optimization target for the optimization mode;

determining one or more index values for one or more indices for the plurality of sub-regions or for the global safe region;

updating the optimization map with at least the one or more index values for the one or more indices; and determining whether one or more other global safe regions exist but have not been processed.

20. The article of manufacture of claim 16, the set of acts further comprising:

identifying a plurality of optimization modes for the electronic design;

identifying a plurality of optimization targets including the at least one optimization target for the plurality of optimization modes;

identifying a set of parameters for each optimization mode of the plurality of optimization modes; and identifying a set of thresholds for the set of parameters.

* * * * *